United States Patent
Sudo et al.

(10) Patent No.: US 6,556,542 B1
(45) Date of Patent: Apr. 29, 2003

(54) TRANSFER RATE CONTROLLING DEVICE AND METHOD THEREOF

(75) Inventors: Toshiyuki Sudo, Kanagawa (JP); Kazuto Nishimura, Kanagawa (JP); Masato Okuda, Kanagawa (JP); Jun Tanaka, Kanagawa (JP)

(73) Assignee: Fujitsu Limited, Kawasaki (JP)

( * ) Notice: Subject to any disclaimer, the term of this patent is extended or adjusted under 35 U.S.C. 154(b) by 0 days.

(21) Appl. No.: 09/134,345

(22) Filed: Aug. 14, 1998

(30) Foreign Application Priority Data

Feb. 23, 1998 (JP) .......................... 10-039480

(51) Int. Cl.⁷ ................... H04L 1/00; H04L 12/28
(52) U.S. Cl. .................. 370/236.1; 370/390; 370/395.1
(58) Field of Search ................. 370/432, 229, 370/230, 230.1, 231, 232, 235, 236.1, 236.2, 395.1, 395.21, 395.41, 468, 390

(56) References Cited

U.S. PATENT DOCUMENTS

| | | | | |
|---|---|---|---|---|
| 5,515,359 A | * | 5/1996 | Zheng | 370/231 |
| 5,675,576 A | * | 10/1997 | Kalampoukas et al. | 370/232 |
| 5,737,313 A | * | 4/1998 | Kolarov et al. | 370/234 |
| 5,745,477 A | * | 4/1998 | Zheng et al. | 370/230 |
| 5,754,530 A | * | 5/1998 | Awdeh et al. | 370/234 |
| 5,812,527 A | * | 9/1998 | Kline et al. | 370/232 |
| 5,940,368 A | * | 8/1999 | Takamichi et al. | 370/229 |
| 5,974,033 A | * | 10/1999 | Kamiya et al. | 370/230 |
| 5,991,266 A | * | 11/1999 | Zheng | 370/229 |
| 6,009,078 A | * | 12/1999 | Sato | 370/232 |
| 6,088,359 A | * | 7/2000 | Wicklund et al. | 370/230 |
| 6,185,206 B1 | * | 2/2001 | Nichols et al. | 370/390 |
| 6,400,688 B1 | * | 6/2002 | Lau et al. | 370/236.1 |

FOREIGN PATENT DOCUMENTS

| | | |
|---|---|---|
| JP | 9-83537 | 3/1997 |
| JP | 9-149047 | 6/1997 |
| JP | 9-162897 | 6/1997 |

OTHER PUBLICATIONS

Hong–Yi Tzeng et al "On Max–Min Fair Congestion Control For Multicast ABR Service in ATM", IEEE Journal on Selected Areas in Communications, US, IEEE, Inc., New York, vol. 15, No. 3, pp. 545–555.

Cho–Y–Z et al, "An Efficient Rate–Based Algorithm For Point–To–Multipoint ABR Service" Global Telecommunications, Conference (Globecom), US, New York, IEEE, pp. 790–795.

* cited by examiner

*Primary Examiner*—Chau Nguyen
*Assistant Examiner*—Andy Lee
(74) *Attorney, Agent, or Firm*—Katten Muchin Zavis Roseman

(57) ABSTRACT

A cell transmitted from a transmitting terminal is multicast to a plurality of receiving terminals. The plurality of receiving terminals respectively transmit B-RM cells to the transmitting terminal. Each of the B-RM cells is assigned an ER value. An ER value calculating unit calculates an average value of the ER values which are respectively assigned to the B-RM cells from the plurality of receiving terminals. A B-RM cell processing unit transfers to the transmitting terminal a B-RM cell to which the ER value calculated by the ER value calculating unit is assigned. The transmitting terminal controls the transmission rate of a multicast communication with the plurality of receiving terminals according to the ER value assigned to the received B-RM cell.

18 Claims, 19 Drawing Sheets

| | |
|---|---|
| VCI-A | VCI-z |
| VCI-B | VCI-y |
| VCI-G1 | VCI-a |
| VCI-G1 | VCI-b |
| VCI-G1 | VCI-c |
| VCI-C | VCI-x |
| ⋮ | ⋮ |

MULTICAST GROUP { (rows VCI-G1)

F I G. 4

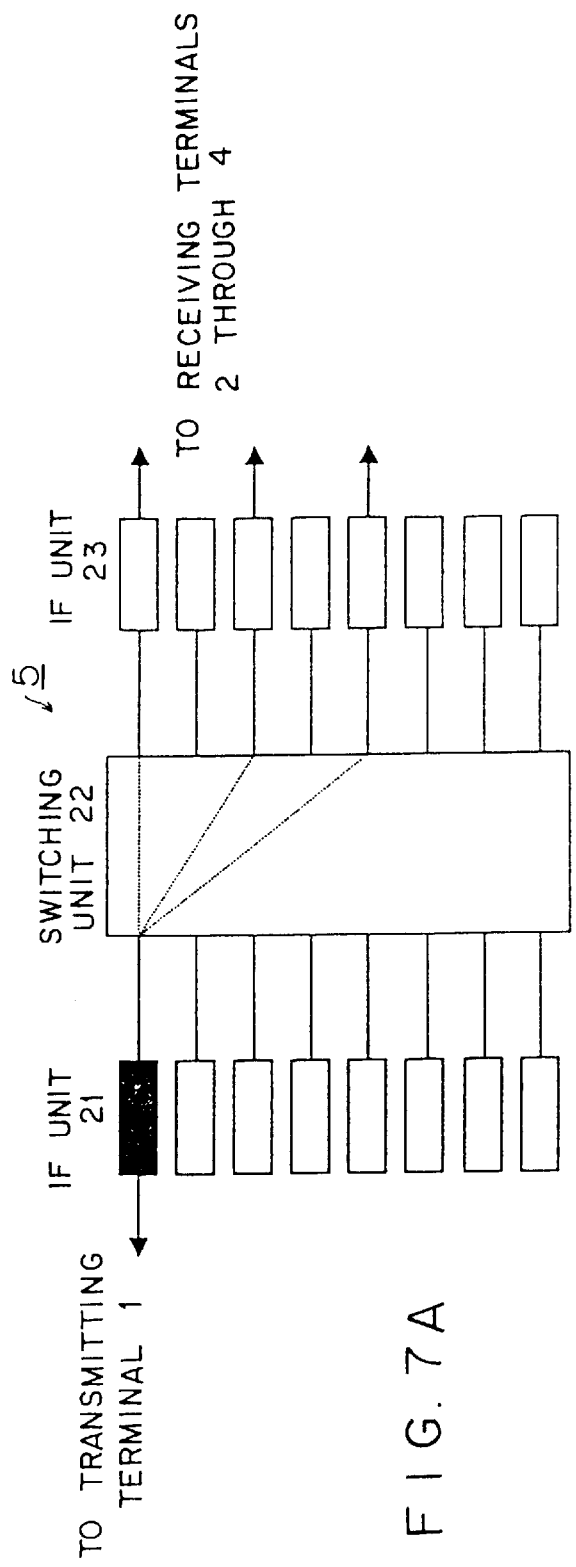
F I G. 7A
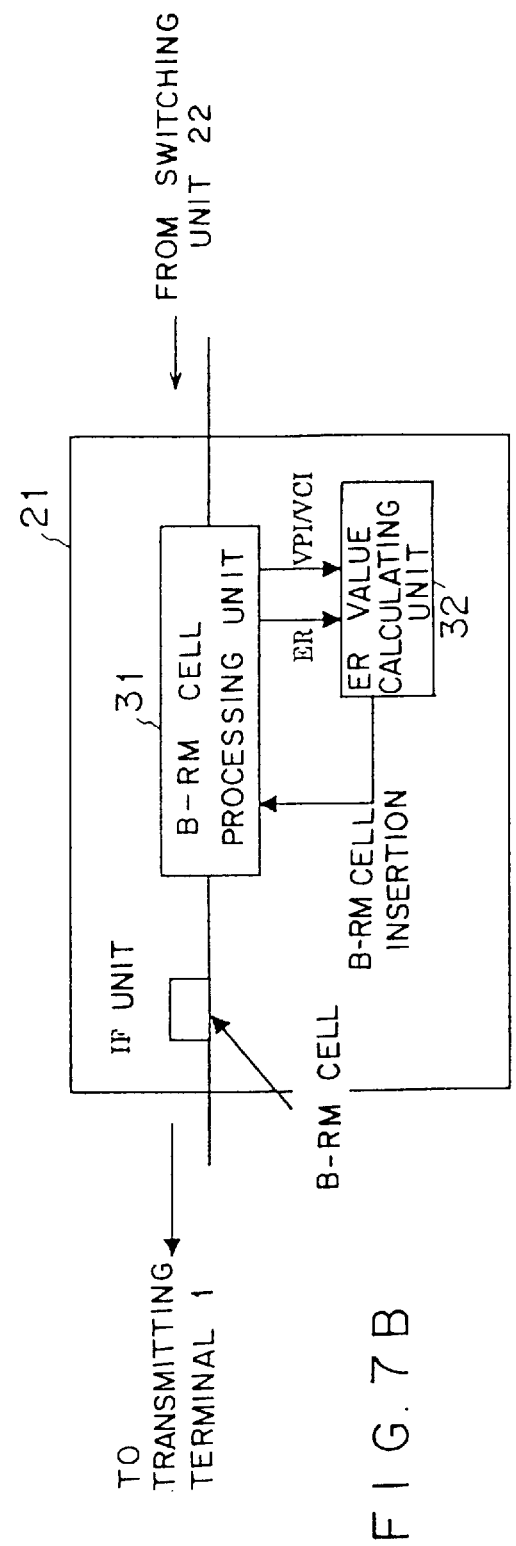
F I G. 7B

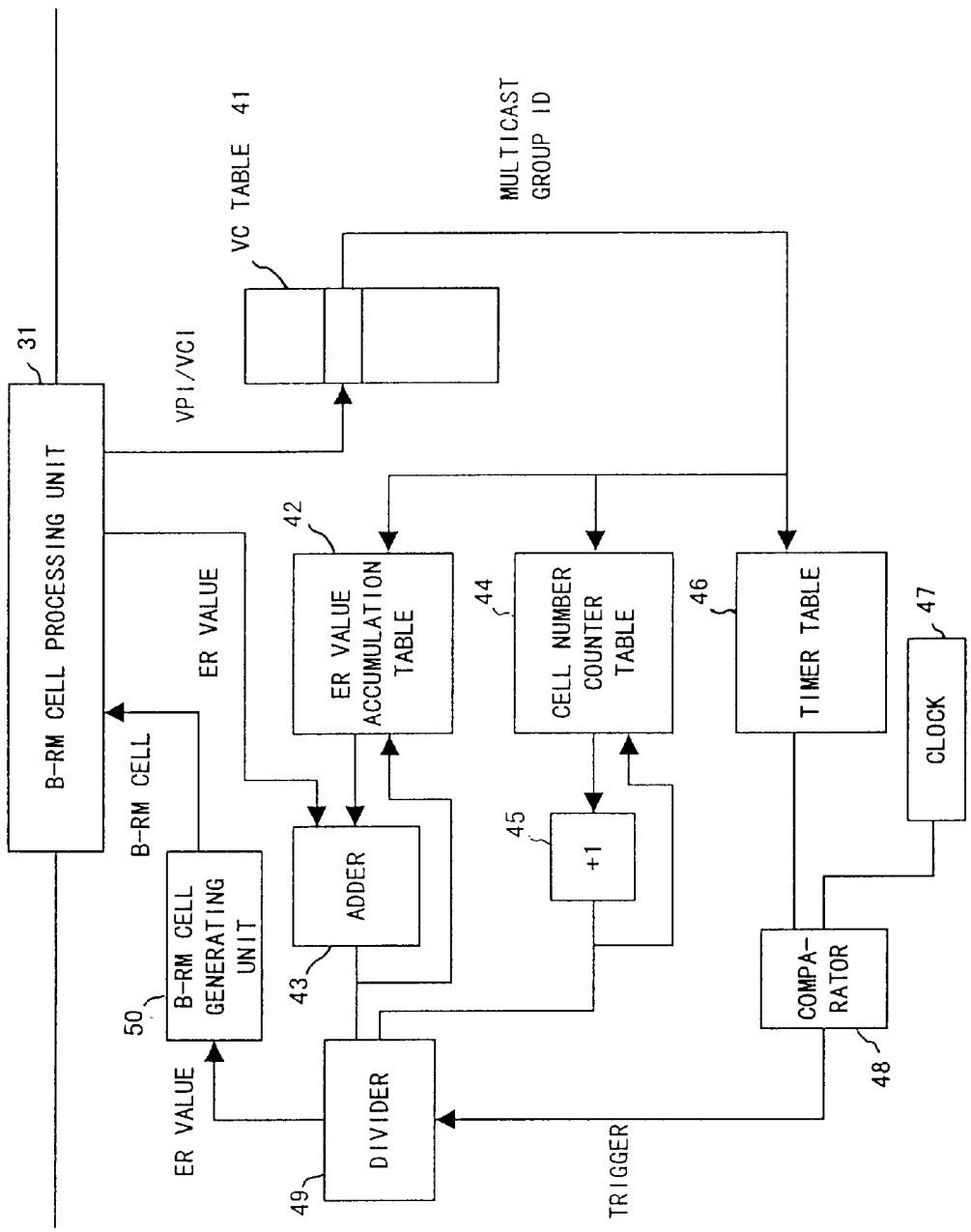
F I G. 8

F I G. 9A

| MULTICAST GROUP ID | ACCUMULATED VALUE |
|---|---|
| VCI-G1 | 7.35 |
| VCI-G2 | 10.28 |
| . | . |
| . | . |
| . | . |
| . | . |

F I G. 9B

| MULTICAST GROUP ID | COUNT VALUE (NUMBER OF CELLS) |
|---|---|
| VCI-G1 | 7 |
| VCI-G2 | 9 |
| . | . |
| . | . |
| . | . |
| . | . |

F I G. 9C

| MULTICAST GROUP ID | OBSERVATION FLAG |
|---|---|
| VCI-G1 | 1 |
| VCI-G2 | 1 |
| . | . |
| . | . |
| . | . |
| . | . |

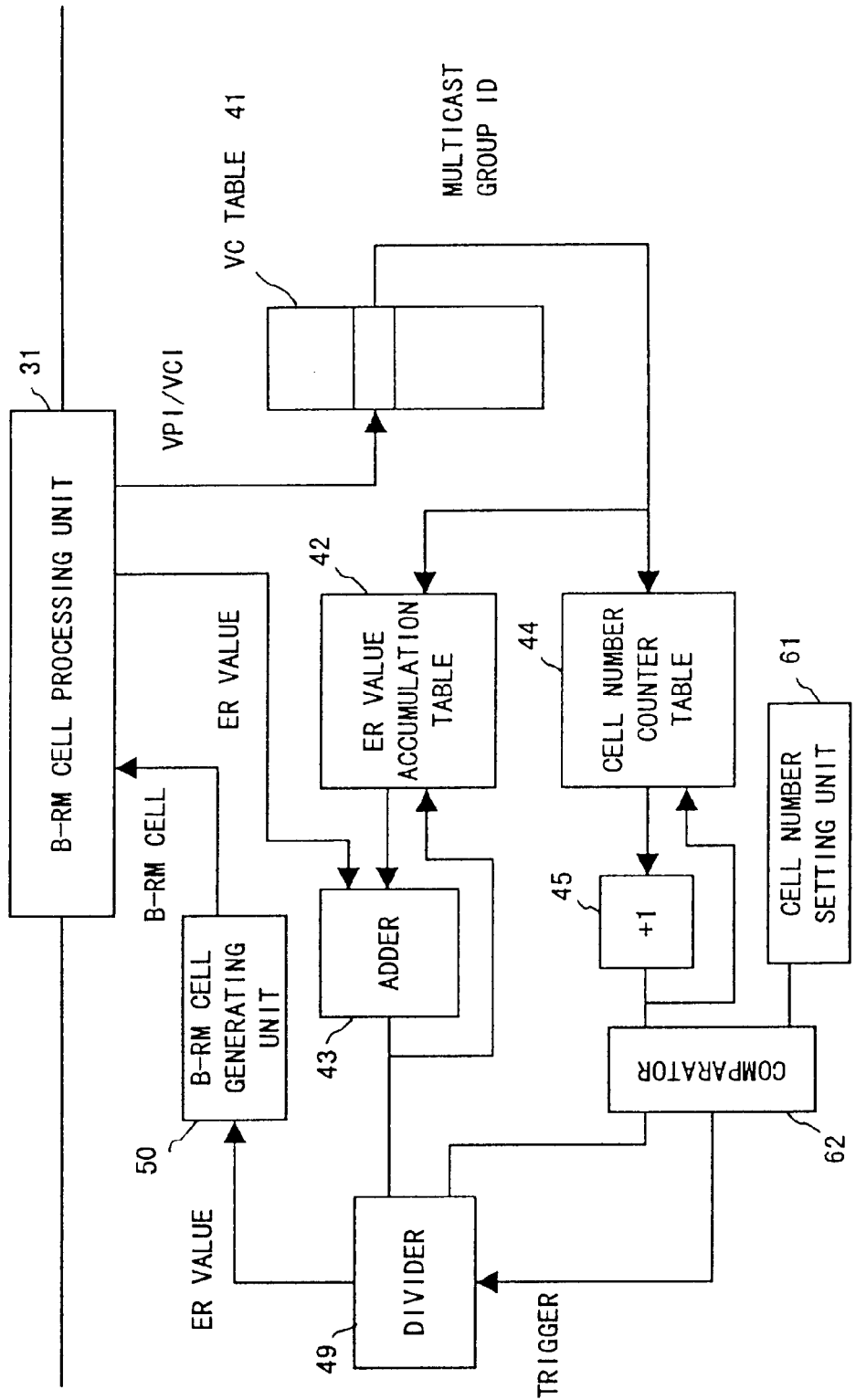
F I G. 10

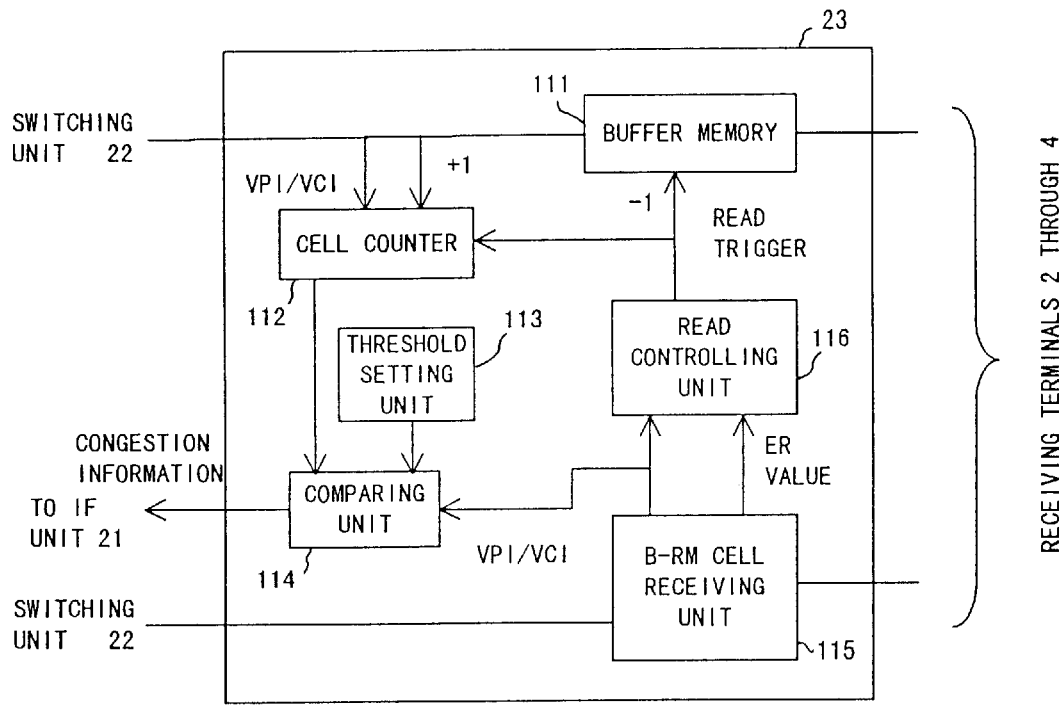
F I G. 1 5 A
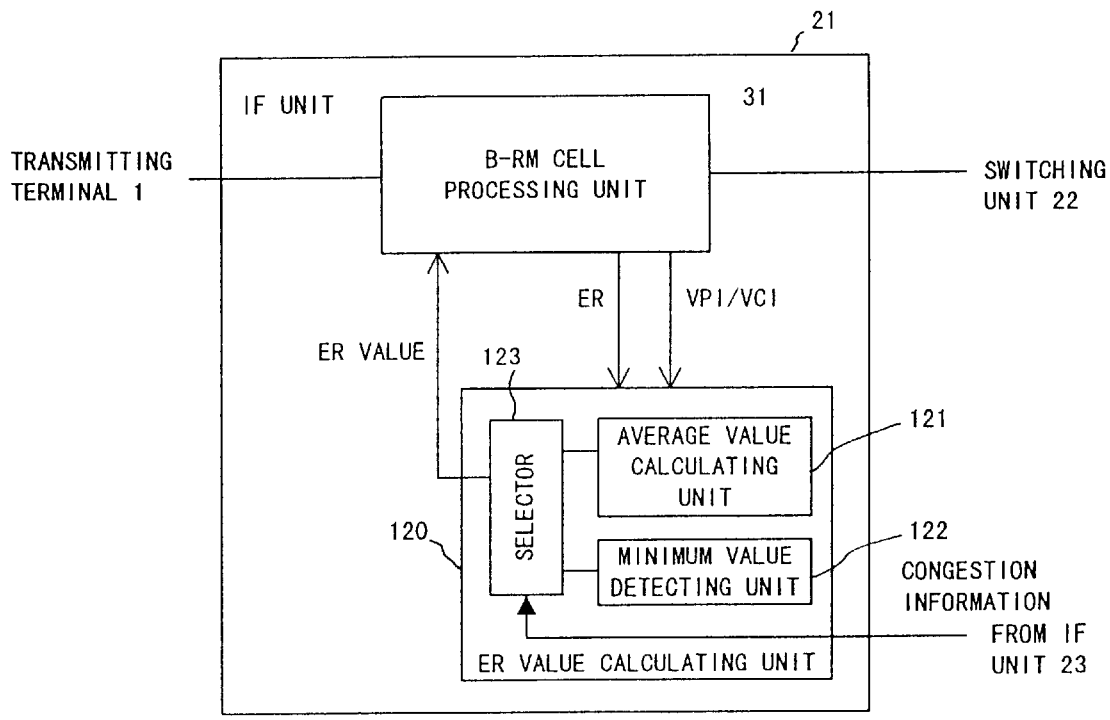
F I G. 1 5 B

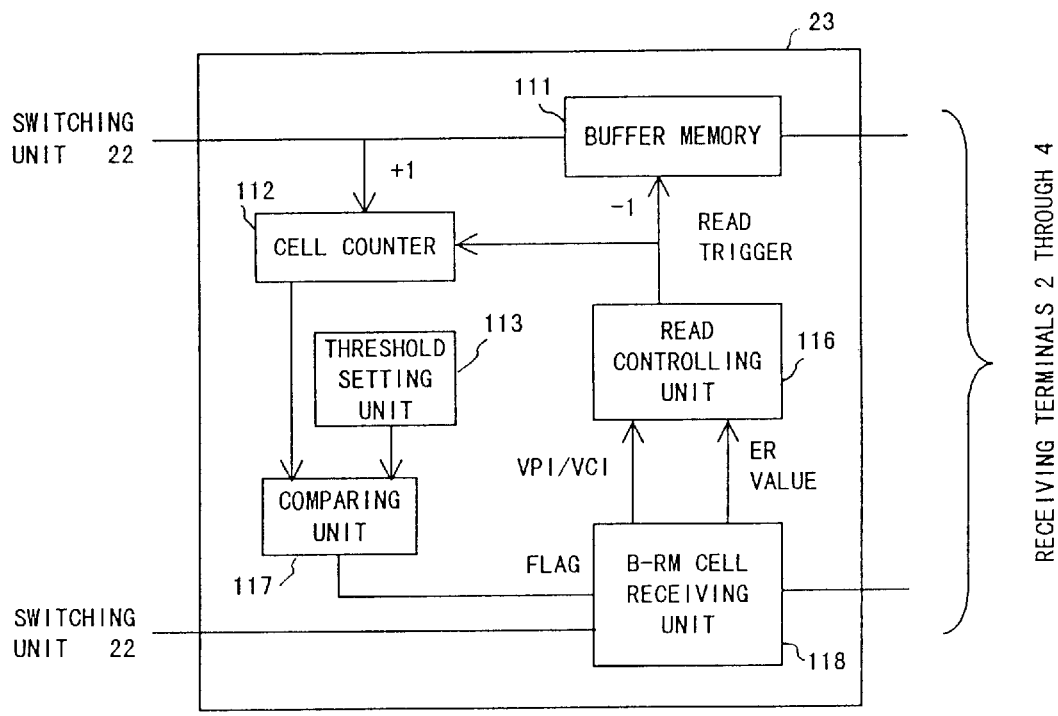
F I G. 1 7 A
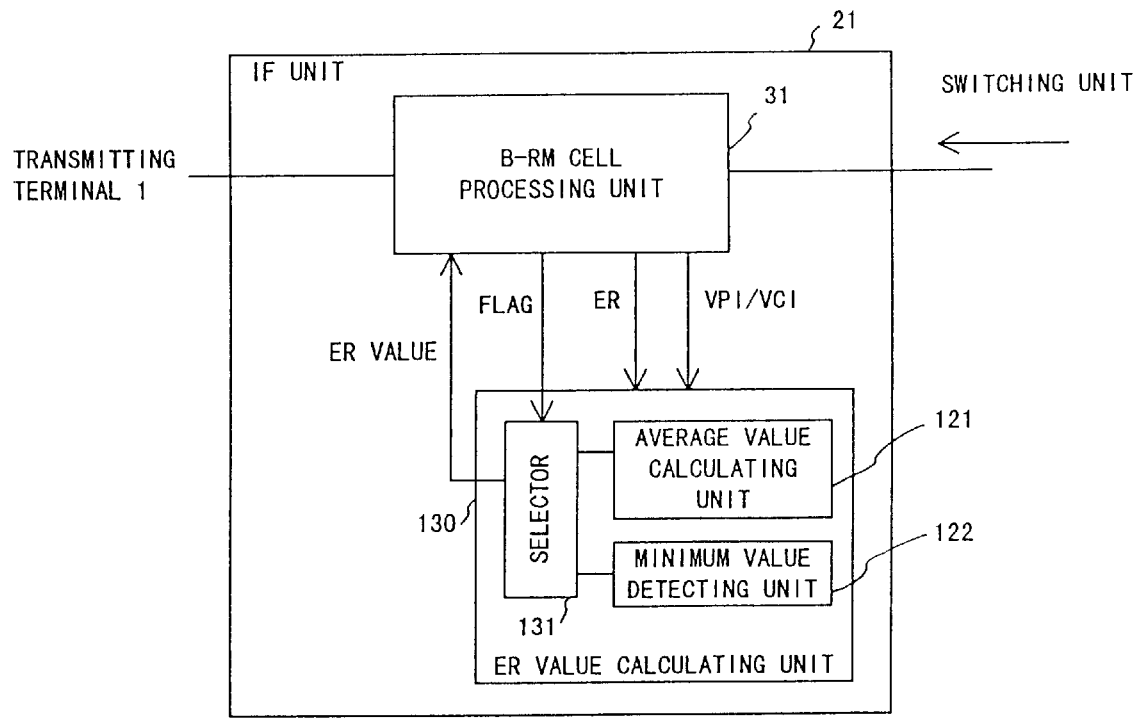
F I G. 1 7 B

| MULTICAST VCI | VCI BELONGING TO MULTICAST GROUP | SPECIFI-CATION |
|---|---|---|
| VCI-G1 | VCI-a | |
| | VCI-b | O |
| | VCI-c | |
| VCI-G2 | VCI-d | O |
| | VCI-e | |
| | VCI-f | |
| | ⋮ | |

TRANSFER RATE CONTROLLING DEVICE AND METHOD THEREOF

BACKGROUND OF THE INVENTION

1. Field of the Invention

The present invention relates to a device for controlling a transfer rate of a system for multicasting a fixed-length packet, and more particularly to a device for controlling a cell transfer rate in a multicast connection to which an ABR service of an ATM network is applied.

2. Description of the Related Art

Currently, the ATM Forum or the ITU-T expects a service referred to as an ABR (Available Bit Rate) to be suitable for of applying a data exchange technique using an ATM (Asynchronous Transfer Mode) to high-speed Internet communications such as a LAN (Local Area Network), a WAN (Wide Area Network), etc.

In a system where the ABR service is provided, the information about the congested state of a network is returned from the network to a transmitting terminal, which changes its transmission rate according to this information. That is, a switch monitors the use state of network resources, and notifies the transmitting terminal of its transmission rate. This transmission rate is referred to as an ER (Explicit Cell Rate) value which can be a value between a peak cell rate and a minimum cell rate, both of which are preregistered for each terminal. For example, if the network is not congested, the ER value approximates to the peak cell rate. Therefore, the transmitting terminal can transmit data at a high transmission rate according to the ER value. If the network is congested, the ER value drops to the minimum cell rate. Accordingly, the transmitting terminal transmits data at a low transmission rate according to the ER value. Network congestion and cell discarding are prevented in the ABR service as described above.

FIG. 1 is a schematic diagram for explaining the concept of the ABR service. In the ABR service, a transmitting terminal transmits an RM (Resource Management) cell to a network each time it transmits a predetermined number of user data cells. The RM cell is transferred to a receiving terminal via the network. Upon receipt of the RM cell, the receiving terminal returns the RM cell to the transmitting terminal. The RM cell transferred from the transmitting terminal to the receiving terminal is referred to as an F-RM (Forward RM) cell, while the RM cell returned from the receiving terminal to the transmitting terminal is referred to as a B-RM (Backward RM) cell.

Written to the F-RM cell is the transmission rate allowed by the network for the transmitting terminal, that is, the current ER value. The switch monitors the congested state of the network, and calculates the ER value for the transmitting terminal according to the congested state. The switch then writes the calculated ER value to the B-RM cell to be transferred to the transmitting terminal, and notifies the transmitting terminal of the latest ER value. The transmitting terminal changes its transmission rate according to the ER value written to the received B-RM cell.

FIG. 2 shows an example where multicast is applied to an ABR communication. If a cell is multicast to a plurality of terminals, the process for copying the cell is normally performed in a switch. The switch performing this process is referred to as a copy node. The copy node copies an RM cell as well as a user data cell.

If a copy node 504 determines that the cell received from a transmitting terminal 501 (including a user data cell and an F-RM cell) is a cell to be multicast according to the routing information set in the header of that cell, it copies the cell the same number of times as that of receiving terminals, and transmits the copied cells to respective receiving terminals 502 and 503. The receiving terminals 502 and 503 return an RM cell among other received cells to the copy node 504 as a B-RM cell. The copy node 504 generates a B-RM cell to be transferred to the transmitting terminal 501 from a plurality of B-RM cells received from the receiving terminals 502 and 503. The latest ER value to be notified to the transmitting terminal 501 is written to this B-RM cell. The transmitting terminal 501 adjusts its transmission rate according to the ER value set in the B-RM cell.

Since the ABR communication is a relatively new technique, part of its detailed specification is yet to be determined. Especially, there are many elements yet to be determined in the system where the ABR is introduced to a multicast communication. Also a specific method for determining the above described ER value has not been determined for the multicast communication up to now.

The ER value is determined according to the use state of network resources (the congested state of a network) as described above. However, since the amount of data to be transferred over a network fluctuates, it is complicated to control the update of the ER value according to its fluctuations in a multicast communication. For example, the congested state of the path between the copy node 504 and the receiving terminal 502 may sometimes differ from that of the path between the copy node 504 and the receiving terminal 503. If such a difference occurs, it is desirable that the ER value should be changed.

We cite an example here. Assume that the transmitting terminal 501 transmits data according to a certain ER value, and also the copy node 504 transfers data to the receiving terminals 502 and 503 at the same transfer rate as the ER value. Also assume that congestion occurs on the path between the copy node 504 and the receiving terminal 502 in this situation. If the copy node 504 does not change the ER value to be notified to the transmitting terminal 501 in this case, the cell to be transferred to the receiving terminal 502 will be discarded. If the ER value is decreased to the transfer rate suitable for the path on which the congestion occurs in order to prevent such cell discarding, the transmission rate of the transmitting terminal 501 is lower than that required by the receiving terminal 503. As a result, the system efficiency is degraded. Especially, if the ER value to be notified to the transmitting terminal 501 is made lower than is needed due to instantaneous congestion, the overall transfer efficiency is degraded.

SUMMARY OF THE INVENTION

The present invention aims at overcoming the above described problems, and at providing a transfer rate controlling device for improving the transmission (transfer) efficiency while preventing packets from being discarded in a system which multicasts and transmits fixed-length packets.

The transfer rate controlling device according to the present invention assumes the configuration where the transmission rate of a transmitting terminal when the transmitting terminal multicasts a fixed-length packet to a plurality of receiving terminals is controlled in a network where the transfer rate allowed by the path to a receiving terminal is notified to the transmitting terminal by a management fixed-length packet, while the transmitting terminal transfers a fixed-length packet to the receiving terminal. This device comprises: an extracting unit for extracting the transfer rate from the management fixed-length packet which proceeds to the transmitting terminal; a calculating unit for obtaining a parameter instructing a transmission rate of the transmitting terminal by performing a predetermined operation (such as a calculation of an average value of a plurality of transfer rates) for the plurality of transfer rates extracted by the extracting unit; and a notifying unit for notifying the transmitting terminal of the parameter obtained by the calculating unit.

With the above described configuration, an optimum transfer rate can be determined according to a network state even in a multicast communication. Especially, if the average value of a plurality of transfer rates is used as the parameter instructing the transmission rate of a transmitting terminal, the improvement of the transmission efficiency and the prevention of the packet discarding can be implemented in good balance.

The transfer rate controlling device according to the present invention may further comprise a buffer for storing a fixed-length packet which is transmitted from the transmitting terminal and is copied to be transferred to a plurality of receiving terminals in correspondence with the paths to the plurality of receiving terminals; and a transmitting unit for reading a fixed-length packet from the buffer according to the transfer rate extracted by the extracting unit corresponding to the path on which a management fixed-length packet storing the extracted transfer rate has been transferred, and for transmitting the read fixed-length packet via the path, in addition to the above described configuration.

BRIEF DESCRIPTION OF THE DRAWINGS

FIG. 4 shows a VC table arranged in a copy node;

FIG. 7A is a schematic diagram showing the configuration of a copy node;

FIG. 7B is a schematic diagram showing the configuration of an IF unit arranged on a transmitting terminal side;

FIG. 8 is a block diagram exemplifying the configuration of an ER value calculating unit;

FIGS. 9A through 9C respectively exemplify an ER value accumulation table, a cell number counter table, and a timer table;

FIG. 10 is a block diagram exemplifying another configuration of the ER value calculating unit;

FIGS. 15A and 15B respectively show the IF units on the receiving and transmitting terminal sides according to the preferred embodiment shown in FIG. 14;

FIGS. 17A and 17B exemplify the modifications of the IF units shown in FIGS. 15A and 15B;

DESCRIPTION OF THE PREFERRED EMBODIMENTS

Figure 1:
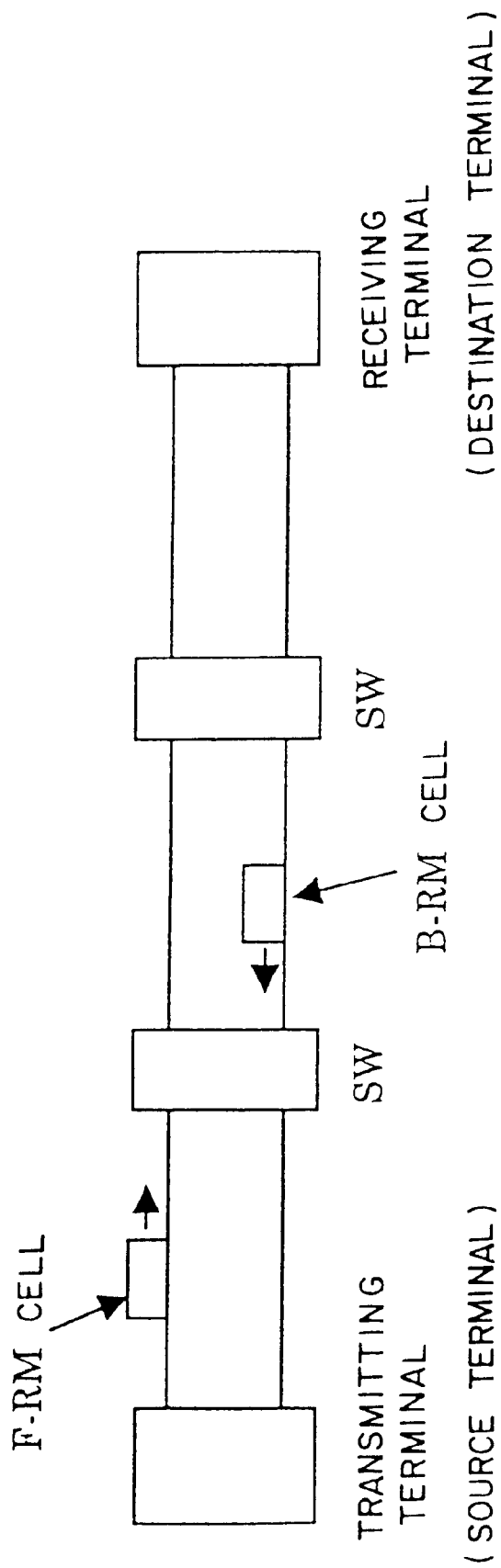
FIG. 1 is a schematic diagram showing the concept of an ABR communication.

Provided below is the explanation about preferred embodiments according to the present invention, by referring to the drawings.

Figure 2:
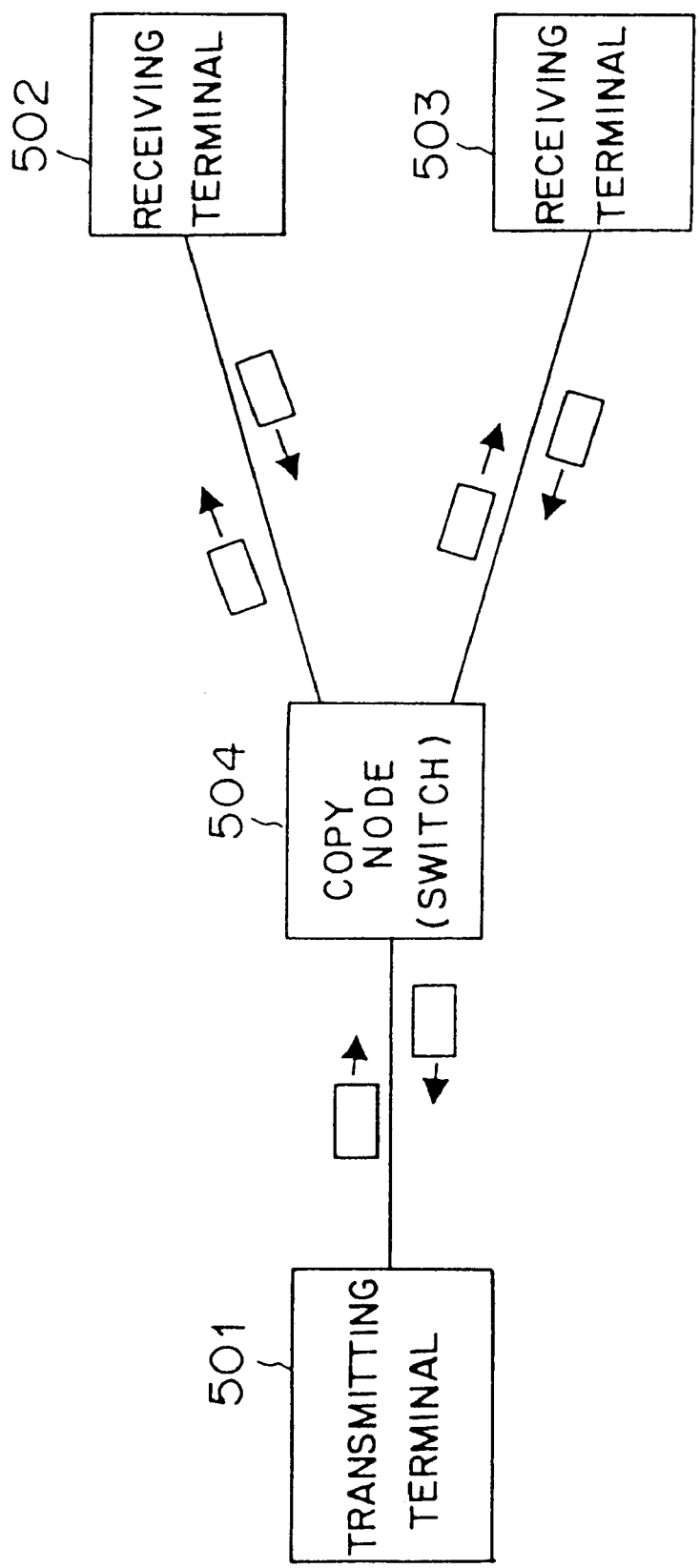
FIG. 2 is a schematic diagram showing the example where a multicast communication is applied to the ABR communication.
Figure 3:
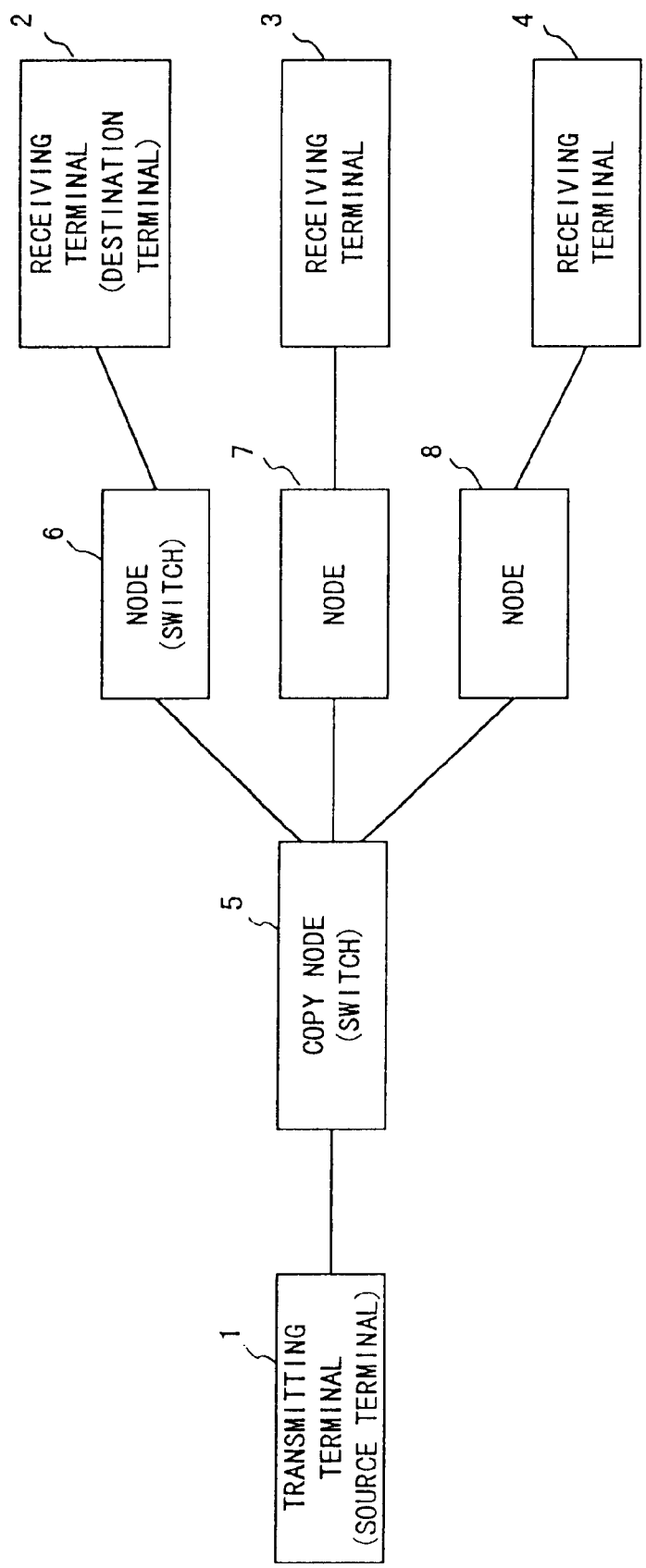
FIG. 3 is a block diagram showing the system to which a transfer rate controlling device according to a preferred embodiment of the present invention is applied.

FIG. 3 is a block diagram showing the system to which a transfer rate controlling device according to a preferred embodiment of the present invention is applied. This preferred embodiment assumes an ATM network which provides an ABR service. In FIG. 3, a transmitting terminal 1 and receiving terminals 2 through 4 correspond to the transmitting terminal 501 and the receiving terminals 502 and 503, which are shown in FIG. 2. A copy node 5 is an ATM switch, which includes a transfer rate controlling device according to this preferred embodiment. Nodes 6 through 8 are ATM switches, which respectively accommodate receiving terminals 2 through 4.

In the system having the above described configuration, the receiving terminals 2 through 4 belong to one multicast group, and this information is registered to the copy node 5. FIG. 4 shows a VC table arranged in the copy node 5. The VC table includes converting patterns to be referenced when the VPI/VCI of each cell is converted. In the example shown in FIG. 4, a plurality of VPIs/VCIs (such as "VCI-a", "VCI-b", and "VCI-c") are set for "VCI-G1". Here, the "VCI-G1" is the VPI/VCI for identifying the virtual channel between the transmitting terminal 1 and the copy node 5. The "VCI-a", the "VCI-b", and the "VCI-c" are the VPIs/VCIs for identifying the respective virtual channels between the copy node 5 and the receiving terminals 2 through 4.

When a cell is multicast from the transmitting terminal 1 to the receiving terminals 2 through 4, the transmitting terminal 1 assigns the "VCI-G1" as the VPI/VCI of the cell and transmits the cell. Upon receipt of the cell (a user data cell or an F-RM cell) to which the "VCI-G1" is assigned as the VPI/VCI, the copy node 5 searches the VC table shown in FIG. 4 by using the "VCI-G1" as a key. When recognizing that the three VPIs/VCIs are assigned to the "VCI-G1", the copy node 5 makes three copies of the received cell, assigns the "VCI-a", the "VCI-b", and the "VCI-c" to the respectively copied cells, and outputs the cells. In this way, the cell transmitted from the transmitting terminal 1 is multicast to the receiving terminals 2 through 4.

The receiving terminals 2 through 4 return an RM cell among other received cells to a network as a B-RM cell. The "VCI-a", the "VCI-b", and the "VCI-c" are respectively assigned to the B-RM cells transmitted from the receiving terminals 2 through 4 as VPIs/VCIs. Upon receipt of the B-RM cell assigned with the "VCI-a", "VCI-b", and the "VCI-c", the copy node 504 calculates the ER value to be notified to the transmitting terminal 1 based on the ER value assigned to each of the B-RM cells. The copy node 504 then transmits the B-RM cell to which the calculated ER value is written to the transmitting terminal 1. The transmitting terminal 1 controls the transmission rate for transmitting cells to the receiving terminals 2 through 4, based on the ER value assigned to the received B-RM cell. Note that B-RM cells are also generated by the respective nodes (the copy node 5 and the nodes 6 through 8).

Figure 5:
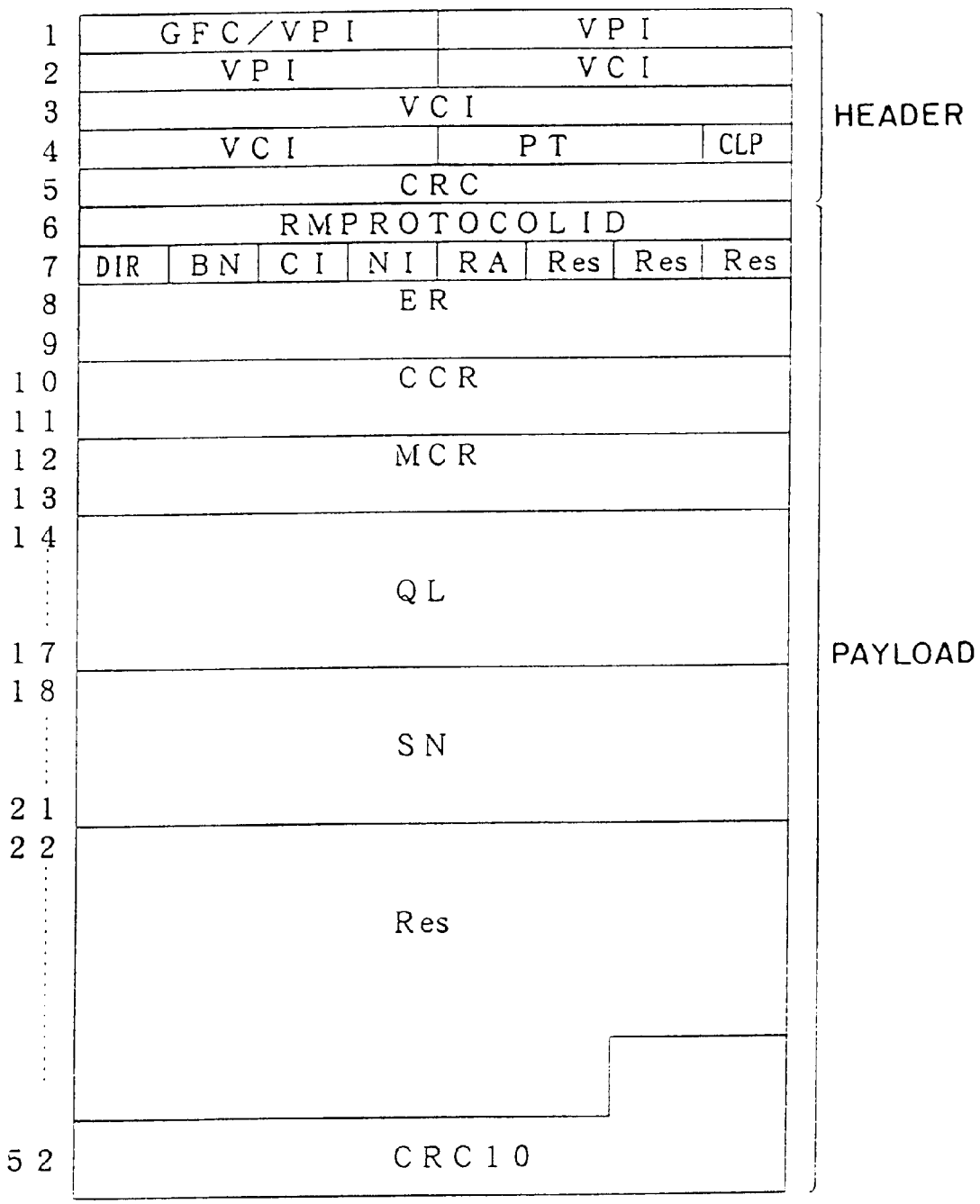
FIG. 5 shows the format of an RM cell.

FIG. 5 shows the format of an RM cell. This format is common to both an F-RM cell and a B-RM cell. The RM cell is composed of a 5-byte header and a 48-byte payload similar to a normal cell. The header includes a GFC (General Flow Control), a VPI (Virtual Path Identifier), a VCI (Virtual Channel Identifier), a PT (Payload Type), a CLP (Cell Loss Priority), and a CRC (Cyclic Redundancy Check). The "GFC/VPI" is used as "GFC" in a UNI (User Network Interface), and as part of the "VPI" in an NNI (Network Network Interface).

"RMPROTOCOLID" is the identifier of an RM protocol. "DIR" is a bit for indicating the transfer direction of an RM cell. For the F-RM cell, the value "0" is assigned to this bit. For the B-RM cell, the value "1" is assigned to this bit. "BN", "CI", "NI", and "RA" are respectively a backward explicit congestion notification bit, a congestion indication bit, a cell rate non-increase bit, and a request acknowledgement bit. "Res" is an unused bit.

"ER", "CCR", and "MCR" are respectively an explicit cell rate, a current cell rate, and a minimum cell rate. "QL" is a queue length which is unused in an ABR communication. "SN" is a sequence number. "CRC" is positioned at the end of the RM cell.

The transmitting terminal 1 normally sets a peak cell rate PCR which is declared to a network as the ER value beforehand when transmitting an F-RM cell, and sets an actual cell rate, that is, the cell rate instructed from the network, as the CCR. The network (including the copy node 5 and the nodes 6 through 8) copies the F-RM cell depending on need, and transfers the copied cells to the receiving terminals 2 through 4. Upon receipt of the F-RM cells, the receiving terminals 2 through 4 return B-RM cells to the transmitting terminal 1. At this time, the network rewrites the B-RM cell to be transferred to the transmitting terminal 1 according to the use state of network resources (whether or not congestion occurs). If congestion occurs, the network decreases the ER value.

Upon receipt of B-RM cells from the receiving terminals 2 through 4, the copy node 5 extracts the ER values assigned to the respective B-RM cells. Since these ER values are rewritten according to the use state of the network resources as described above, they are normally different from one another. For example, if the path between the copy node 5 and the receiving terminal 4 is congested, the ER value of the B-RM cell transferred from the receiving terminal 4 to the transmitting terminal 1 is made small by the node 8. The copy node 5 calculates the ER value to be notified to the transmitting terminal 1 based on the extracted ER values. The calculation of this ER value is one of the principal parts of the present invention.

Figure 6:
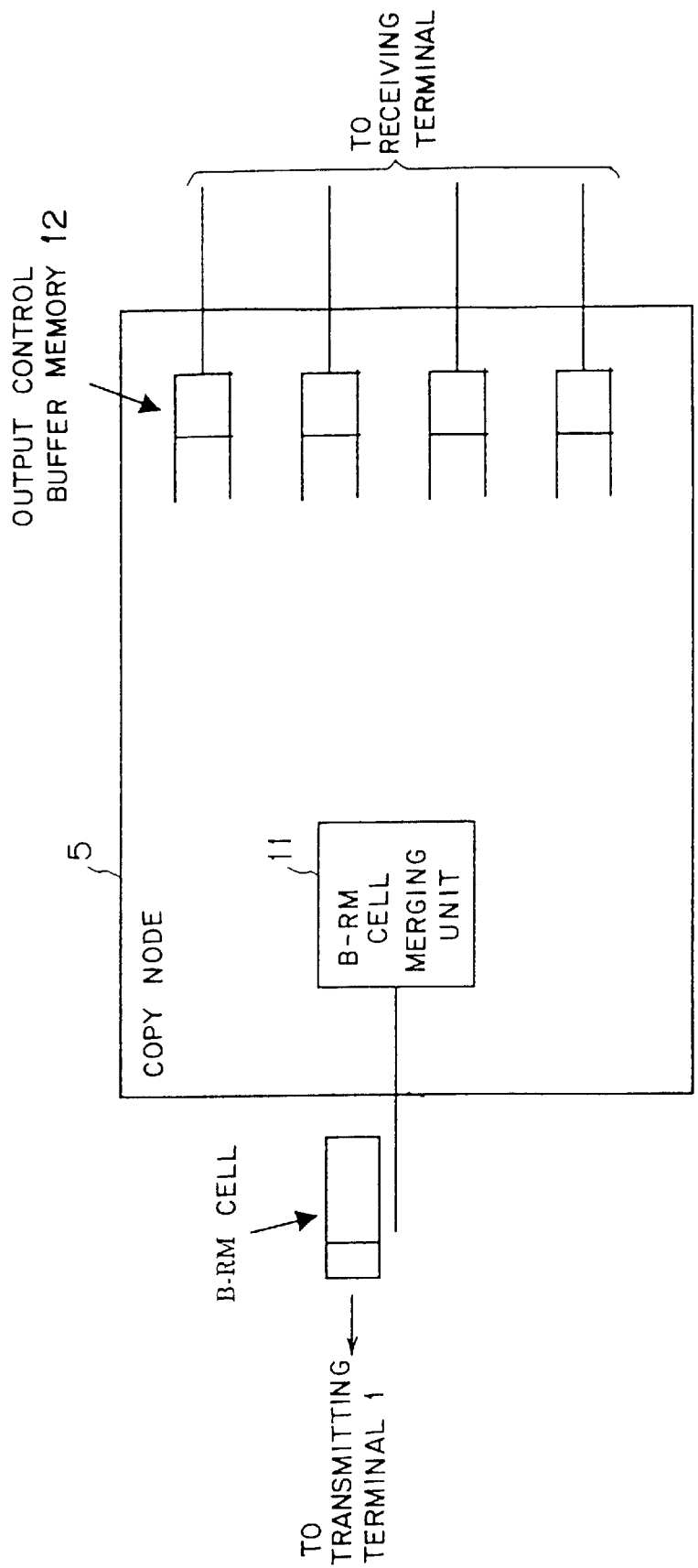
FIG. 6 conceptually shows the capabilities of a copy node according to the preferred embodiment.

FIG. 6 conceptually shows the capabilities of the copy node according to this preferred embodiment. A B-RM cell merging unit 11 extracts the ER values assigned to the respective B-RM cells received from the receiving terminals 2 through 4, and newly calculates one ER value by performing the arithmetic calculation, to be described later, for these ER values. The newly calculated ER value is a parameter for instructing the transmission rate of the transmitting terminal 1. Then, the B-RM cell merging unit 11 writes the ER value obtained as the result of the arithmetic calculation to a B-RM cell, and transmits the B-RM cell to the transmitting terminal 1.

An output control buffer memory 12 temporarily stores the cell transmitted from the transmitting terminal 1 (including a user data cell and an F-RM cell). An output control buffer memory 12 is arranged, for example, for each VPI/VCI of the cell output from the copy node 5.

The output control buffer memory 12 absorbs the rate difference if the transmission rate at which cells can be transmitted via the path between the copy node 5 and a certain receiving terminal becomes lower than that of the transmitting terminal 1 due to the occurrence of congestion between the copy node 5 and the receiving terminal. In this way, cells are prevented from being discarded.

FIG. 7A is a schematic diagram showing the configuration of a copy node. A copy node 5 is fundamentally similar to a normal ATM switch. This node comprises IF units 21 and 23 and a switching unit 22. The IF units 21 and 23 are interfaces which terminate lines (such as a UNI line or an NNI line). Here, the IF unit 21 is an interface arranged on the side of the transmitting terminal 1, while the IF unit 23 is an interface arranged on the side of the receiving terminals 2 through 4. The switching unit 22 switches an arrived cell according to its VPI/VCI. The switching unit 22 has also the capability for copying a cell. Note that the B-RM cells to be transferred from the receiving terminals 2 through 4 to the transmitting terminal 1 are merged by the IF unit 21.

FIG. 7B is a schematic diagram showing the configuration of an IF unit arranged on a transmitting terminal side. An IF unit 21 comprises a B-RM processing unit 31 and an ER value calculating unit 32. Upon receipt of a B-RM cell from the switching unit 22, the B-RM cell processing unit 31 extracts the VPI/VCI and the ER value, which are assigned to the received cell, and passes the extracted VPI/VCI and ER value to the ER value calculating unit 32. Additionally, the B-RM cell processing unit 31 transmits the B-RM cell assigned with the ER value calculated by the ER value calculating unit 32 to a transmitting terminal.

The ER value calculating unit 32 determines whether or not the VPI/VCI received from the B-RM cell processing unit 31 belongs to a preregistered multicast group. If "YES", the ER value calculating unit 32 holds the ER value corresponding to that VPI/VCI. The ER value calculating unit 32 collects ER values for each multicast group. If a predetermined condition is satisfied, the ER value calculating unit 32 calculates one ER value based on the collected ER values. The method for calculating this ER value will be described later in detail. This method is, for example, an arithmetic calculation for obtaining an average value. The ER value calculating unit 32 then generates the B-RM cell to which the calculated ER value is written, and passes the generated cell to the B-RM cell processing unit 31.

Provided next is the explanation about the method for calculating the ER value to be notified to a transmitting terminal based on the ER values assigned to the B-RM cells received from a plurality of receiving terminals, by referring to FIGS. 8 through 10. Here, the example of obtaining the average of a plurality of ER values is explained.

FIG. 8 is a block diagram showing the configuration of an ER value calculating unit. A predetermined observation time period is assigned to the ER value calculating unit shown in FIG. 8. This unit accumulates the ER values assigned to the B-RM cells which arrived during the observation time period for each multicast group, and counts the number of the arrived B-RM cells. The ER value calculating unit then calculates the average of the ER values by dividing the accumulation of the ER values by the number of the arrived B-RM cells. The details of this configuration will be described next.

A VC table 41 is the VC table shown in FIG. 4, or is equivalent thereto. This table registers a multicast group when a multicast communication is made. The VC table 41 is accessed by using the VPI/VCI extracted by the B-RM cell processing unit 31 as a key. If the VPI/VCI belongs to a corresponding multicast group, the VC table 41 outputs the multicast group ID for identifying the multicast group. For example, when the VC table 41 receives the "VCI-a", the "VCI-b", or the "VCI-c" in the state shown in FIG. 4, it outputs the "VCI-G1" as a multicast group ID. The multicast group ID output by the VC table 41 is transmitted to an ER value accumulation table 42, a cell number counter table 44, and a timer table 46.

The ER value accumulation table 42 stores an accumulated value of the ER values output by an adder 43 for each multicast group, as shown in FIG. 9A. Upon receipt of the multicast group ID from the VC table 41, the ER value accumulation table 42 outputs the accumulated value corresponding to the multicast group to the adder 43. The adder 43 adds the ER value passed from the B-RM cell processing unit 31 and the ER accumulated value output from the ER value accumulation table 42, and passes the result of the addition to a divider 49. The ER value accumulation table 42 is updated based on the result of the addition from the adder 43.

The cell number counter table 44 stores the count value output from a counter 45 for each multicast group, as shown in FIG. 9B. Upon receipt of the multicast group ID from the VC table 41, the cell number counter table 44 outputs the count value corresponding to this multicast group ID to the counter 45. The counter 45 increments the count value output from the cell number counter table 44 by 1, and passes this result to the divider 49. The cell number counter table 44 is updated by the output of the counter 45.

The timer table 46 includes an observation flag for each multicast group as shown in FIG. 9C. The observation flag is the information indicating whether or not the ER value and the number of cells are being observed for a corresponding multicast group. This observation flag is reset by trigger information, the output of a comparator 48, and is set by the multicast group ID received from the VC table 41. Furthermore, a predetermined observation time period is assigned to the timer table 46. After setting the corresponding observation flag upon receipt of a multicast group ID from the VC table 41, the timer table 46 outputs the received multicast group ID, the time obtained by adding the current time which is the output of a clock 47 and the value of the observation time period, by making a correspondence between the multicast group ID and the obtained time. When the current time reaches the time output from the timer table 46, the comparator 48 outputs the multicast group ID corresponding to that time and the trigger information. The multicast group ID output from the comparator 48 resets the ER accumulated value stored by the cell number counter table 44, the count value (the number of cells) stored in the cell number counter table 44, and the observation flag set in the timer table 46. This multicast group ID is notified also to a B-RM cell generating unit 50.

Upon receipt of the trigger information, the divider 49 divides the output of the adder 43 at that time by the output of the counter 45. That is, the ER accumulated value is divided by the number of cells. As a result, the average ER value of the multicast group whose observation time period has expired can be obtained.

The B-RM cell generating unit 50 generates a B-RM cell to which a multicast group ID (or the VPI/VCI corresponding to the multicast group ID) output from the comparator 48 is assigned as VPI/VCI, and the output of the divider 49 is written as an ER value, and passes the generated B-RM cell to the B-RM cell processing unit 31.

The above described ER value calculating unit performs the arithmetic calculation related to a plurality of multicast groups in parallel. However, the units denoted by the reference numerals 42 through 50 need to be arranged for each multicast group.

Summarized next are the operations of the ER value calculating unit configured as described above. The timer table 46, the clock 47, and the comparator 48 measure an observation time period. The ER value accumulation table 42 and the adder 43 calculate the total of the ER values assigned to B-RM cells which proceed to the transmitting terminal 1 and which are received during the observation time period for each multicast group. The cell number counter table 44 and the counter 45 obtain the number of B-RM cells which proceed to the transmitting terminal 1 and are received during the observation time period. Then, the divider 49 divides the total of the ER values by the number of cells, so that the average ER value of a corresponding multicast group is obtained. The obtained average ER value is stored in a B-RM cell, which is transmitted to the transmitting terminal 1.

The transmitting terminal 1 controls the transmission rate of the terminal itself so that the rate matches the ER value stored in the B-RM cell. For example, if the copy node 5 receives the B-RM cells which respectively store 10 Mbps, 15 Mbps, and 20 Mbps as ER values from the nodes 6 through 8 in the example shown in FIG. 3, 15 Mbps is obtained as their average value. This value is notified to the transmitting terminal 1. Upon receipt of this value, the transmitting terminal 1 changes the transmission rate for transmitting cells to the receiving terminals 2 through 4 to 15 Mbps.

FIG. 10 is a block diagram showing another configuration of the ER value calculating unit. The ER value calculating unit shown in FIG. 8 obtains an average ER value in each predetermined observation time period. In the meantime, the ER value calculating unit shown in FIG. 10 obtains an average ER value each time a predetermined number of B-RM cells are received.

A cell number setting unit 61 stores a predetermined number of cells. Note that the number of cells may differ depending on each multicast group ID. The cell number counter table 44 and the counter 45 count the number of B-RM cells received for each multicast group in a similar manner as in the configuration shown in FIG. 8. A comparator 62 makes a comparison between the output of the counter 45 and that of the cell number setting unit 61 for each multicast group, and outputs the trigger information similar to that shown in FIG. 8 when the outputs match. Additionally, the comparator 62 outputs the number of counted B-RM cells along with the trigger information.

The rest of the units are the same as those explained by referring to FIG. 8. That is, the ER value accumulation table 42 and the adder 43 calculate the total of the ER values assigned to received B-RM cells. The divider 49 then calculates the average ER value of a corresponding multicast group by dividing the total ER value by the number of cells.

Figure 11:
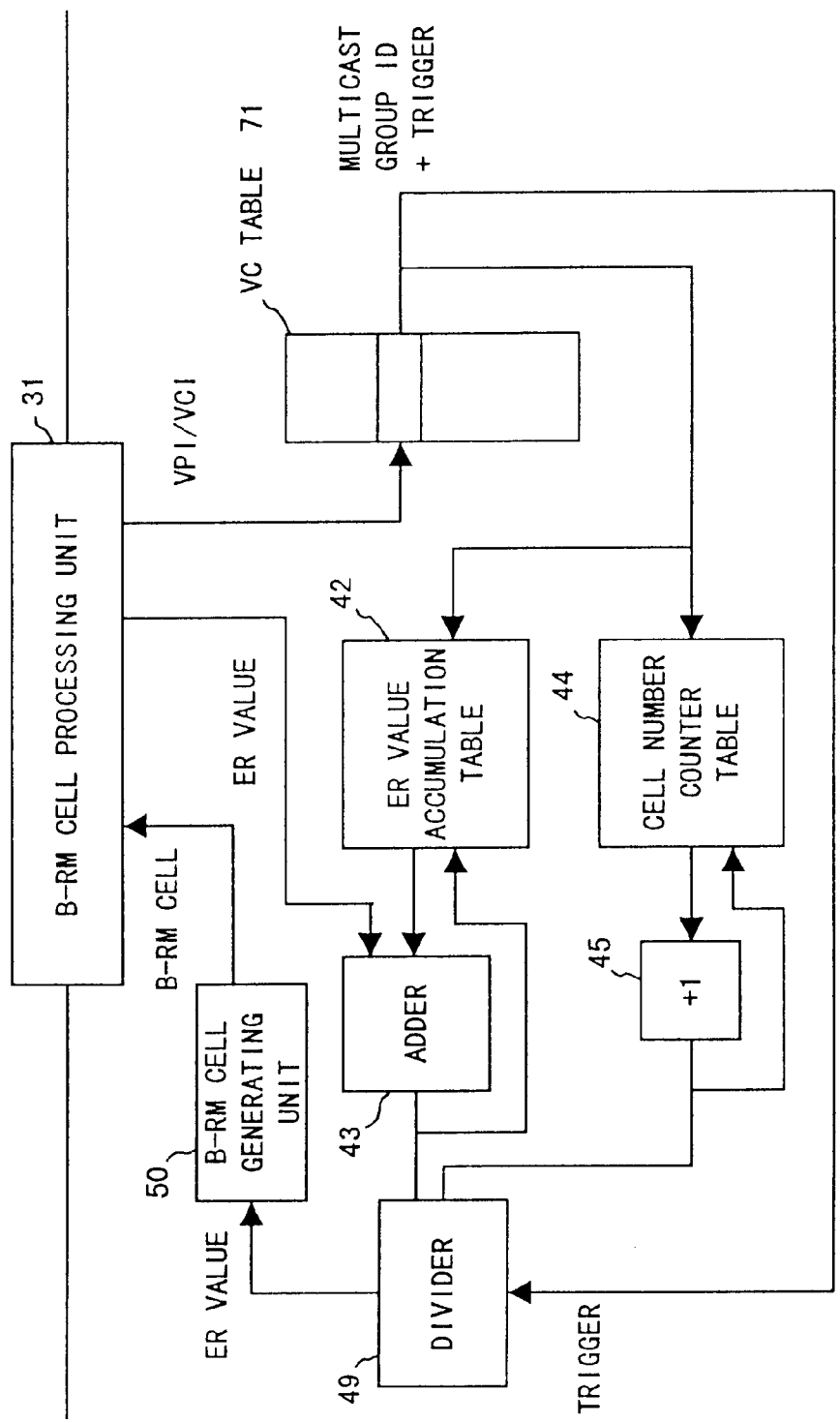
FIG. 11 is a block diagram exemplifying a further configuration of the ER value calculating unit.

FIG. 11 is a block diagram showing a further configuration of the ER value calculating unit. The ER value calculating unit shown in FIG. 11 obtains the average ER value of a multicast group each time a B-RM cell assigned with particular VPI/VCI belonging to the multicast group is received. To implement this configuration, a VC table 71 has the capability for outputting trigger information upon receipt of the predetermined particular VPI/VCI.

The operations of the ER value calculating unit shown in FIG. 11 are explained by taking the multicast communication shown in FIG. 3 as an example. Here, assume that the respective VPIs/VCIs of the cells transmitted from the receiving terminals 2 through 4 to the transmitting terminal 1 are "VCI-a", "VCI-b", and "VCI-C", and the "VCI-a" is assigned as particular VPI/VCI. In this case, the VC table 71 outputs the trigger information each time it receives the B-RM cell to which the "VCI-a" is assigned. At this time, the cell number counter table 44 and the counter 45 count and output the number of B-RM cells to which the "VCI-a", the "VCI-b", and the "VCI-C" are assigned, at each interval between the reception of the B-RM to which the "VCI-a" is assigned and the next B-RM cell to which the "VCI-a" is also assigned, whenever receiving the B-RM cell to which the "VCI-a" is assigned. In the meantime, the ER value accumulation table 42 and the adder 43 total and output the ER values assigned to the respectively counted B-RM cells. Then, the divider 49 calculates the average ER value of the corresponding multicast group by dividing the total ER value by the number of cells.

Figure 12A:
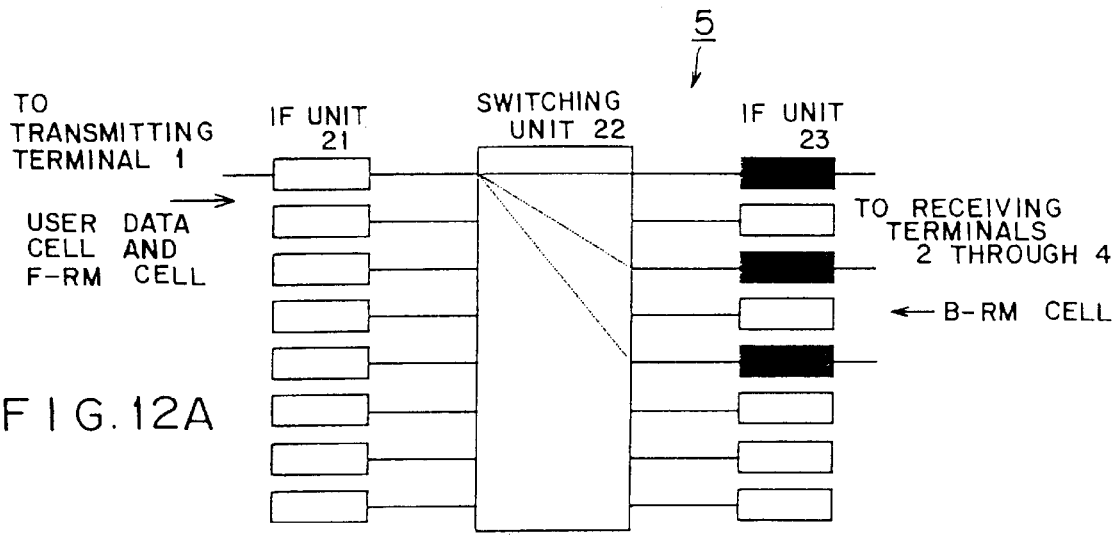
FIG. 12A is schematic diagram showing the configuration of a copy node.

FIG. 12A shows the configuration of a copy node. The copy node 5 comprises a buffer for temporarily storing a cell output from a switching unit 22. For example, the buffer for temporarily storing the cells to be transferred from the transmitting terminal 1 to the receiving terminals 2 through 4 is arranged in the IF unit 23. In this case, the IF unit 23 reads out the cells from the buffer at a rate according to the ER values assigned to the B-RM cells transferred from the receiving terminals 2 through 4, and transmits the cells to the receiving terminals.

Figure 12B:
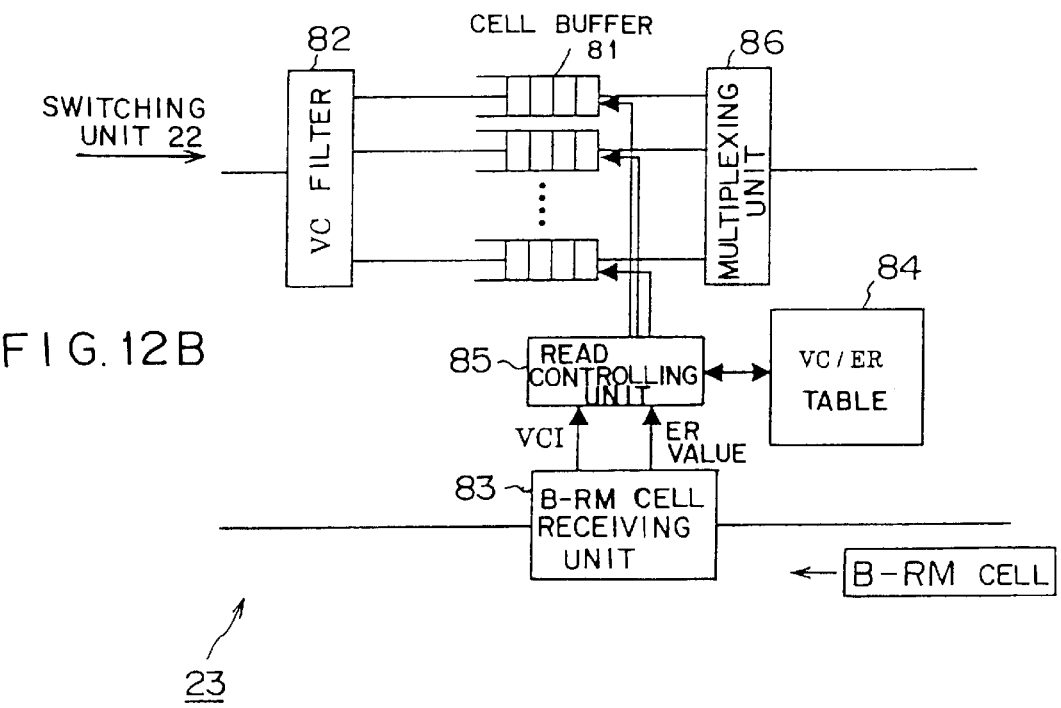
FIG. 12B is a schematic diagram showing the configuration of an IF unit arranged on a receiving terminal side.

FIG. 12B shows the configuration of an IF unit arranged on a receiving terminal side. The IF unit 23 comprises a plurality of cell buffers 81 which respectively correspond to predetermined VPIs/VCIs (or to predetermined VCIs). The plurality of cell buffers 81 are FIFO memories or queue memories. A VC filter 82 detects the VPI/VCI of the cell (including a user data cell and an F-RM cell) received from the switching unit 22, and writes the received cell to the cell buffer 81 corresponding to that VPI/VCI.

A B-RM cell receiving unit 83 extracts the VPI/VCI and the ER value from the received B-RM cell. A VC/ER table 84 stores the VPI/VCI extracted by the B-RM cell receiving unit 83 by making a correspondence between the VPI/VCI and the ER value. The VC/ER table 84 is updated each time the B-RM cell receiving unit 83 extracts the VCI/VCI and the ER value from a B-RM cell, or at predetermined time intervals. A read controlling unit 85 reads out a cell from the buffer corresponding to the ER value stored in the VC/ER table 84, for each VPI/VCI. That is, the read controlling unit 85 reads out a cell from the buffer 81 arranged for each VPI/VCI at the rate determined according to the ER value assigned to a received B-RM cell. A multiplexing unit 86 multiplexes the cells read from the plurality of cell buffers 81, and outputs the multiplexed cell to an output line.

As described above, according to this preferred embodiment, a cell buffer is arranged for each VPI/VCI, and the speed at which a cell is read from a corresponding cell buffer is controlled based on the ER value assigned to a B-RM cell, thereby preventing the cell from being discarded.

Figure 13:
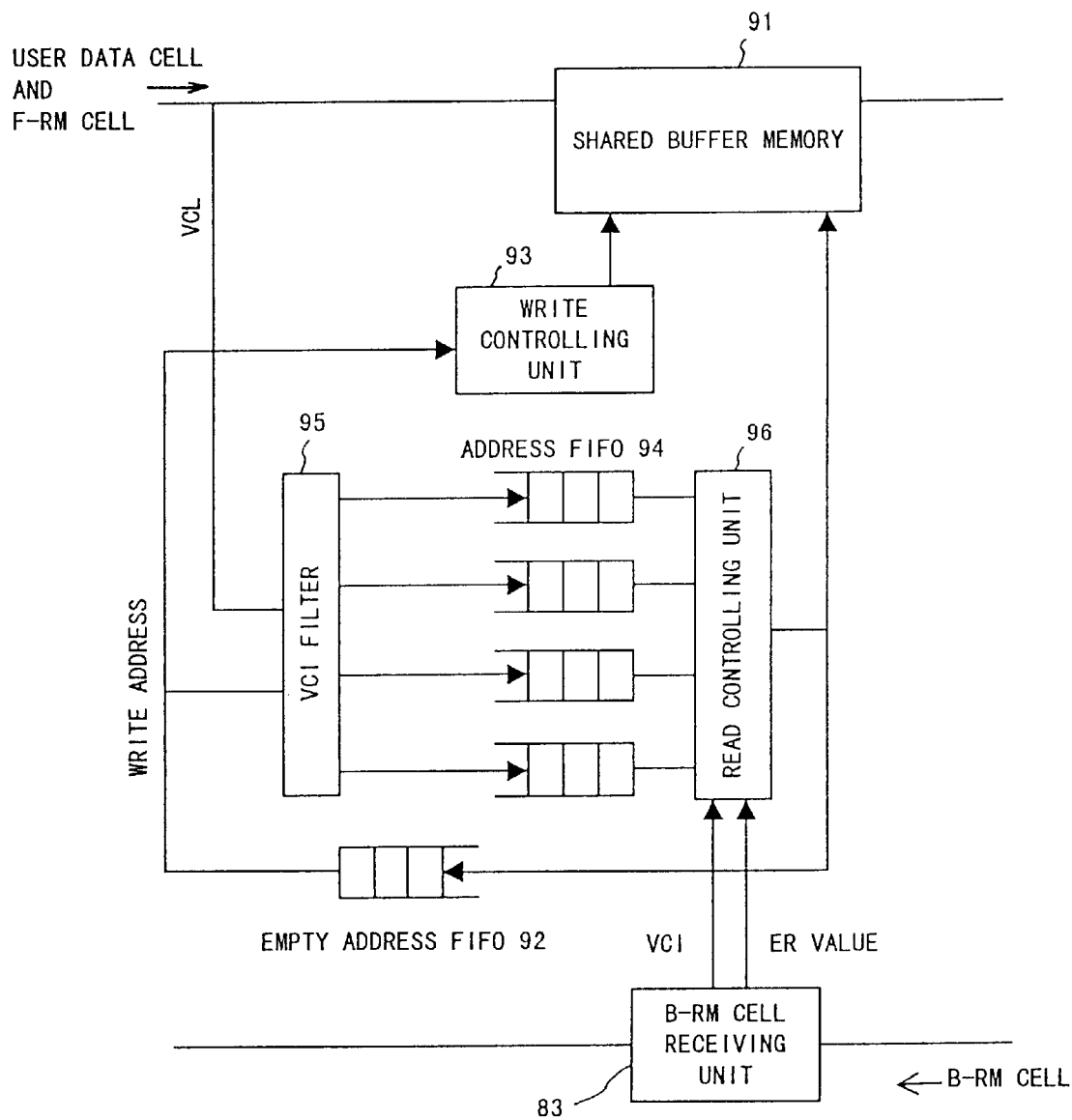
FIG. 13 shows another configuration of the IF unit arranged on the receiving terminal side.

FIG. 13 is a schematic diagram showing another configuration of the IF unit arranged on the receiving terminal side. In the configuration shown in FIG. 12B, cells are stored in the cell buffers arranged for respective VPIs/VCIs. However, in the configuration shown in FIG. 13, cells are stored in a shared buffer.

A shared buffer memory 91 stores the cells output from the switching unit 22 (a user data cell or an F-RM cell). In the shared buffer memory 91, an address is managed for each area corresponding to one cell. An empty address FIFO 92 stores addresses in an unused area of the shared buffer memory 91. The output of the empty address FIFO 92 is provided to a write controlling unit 93 and a VCI filter 95.

When the IF unit 23 receives the cell output from the switching unit 22, the write controlling unit 93 obtains an address from the empty address FIFO 92 and writes the received cell to the area in the shared buffer memory 91, which corresponds to that address. A plurality of address FIFOs 94 are arranged for respective VPIs/VCIs, and are intended to store the address to which a cell is written in the shared buffer memory 91. A VCI filter 95 detects the VPI/VCI of the cell, which is written to the shared buffer memory 91, and writes the address to which the cell is written to the address FIFO 94 corresponding to the VPI/VCI of that cell. The address written to the address FIFO 94 at this time is the address that the write controlling unit 93 receives from the empty address FIFO 92.

The B-RM cell receiving unit 83 detects the VPI/VCI and the ER value, which are assigned to the B-RM cell received from a receiving terminal or a network, inputs the extracted VPI/VCI and ER value to the read controlling unit 96, and passes that B-RM cell to the switching unit 22, in a similar manner as in FIG. 12B. The read controlling unit 96 holds the ER value of each VPI/VCI, which is received from the B-RM cell receiving unit 83, and reads out an address from the corresponding address FIFO 94 at the rate (at a reading speed) according to the ER value for each VPI/VCI. Then, the read controlling unit 96 reads out a cell from the shared buffer memory 91 by using the address extracted from the address FIFO 94, and outputs the read cell. The area address from which the cell is read is rewritten to the empty address FIFO 92.

Use of a shared memory for storing cells as in the above described configuration allows higher memory use efficiency than that in the configuration where memories are arranged for respective VPIs/VCIs, thereby reducing the size of the hardware configuration. Although the shared buffer is not directly corresponded to a cell and its VPI/VCI, the storage address of a cell is stored for the VPI/VCI of the cell. Accordingly, each cell and its VPI/VCI are corresponded to each other and stored also in the configuration shown in FIG. 13.

In the copy node according to this preferred embodiment, the IF unit on the transmitting terminal side has the capability of calculating the ER value to be notified to the transmitting terminal, while the IF unit on the receiving terminal side has the buffer for absorbing the difference between the cell transmission rates of the transmitting terminal and those of the receiving terminals. The ER value to be notified to the transmitting terminal is calculated by averaging the ER values which are respectively assigned to the B-RM cells returned from the plurality of receiving terminals, as in the example explained by referring to FIGS. 8 through 11.

Figure 14:
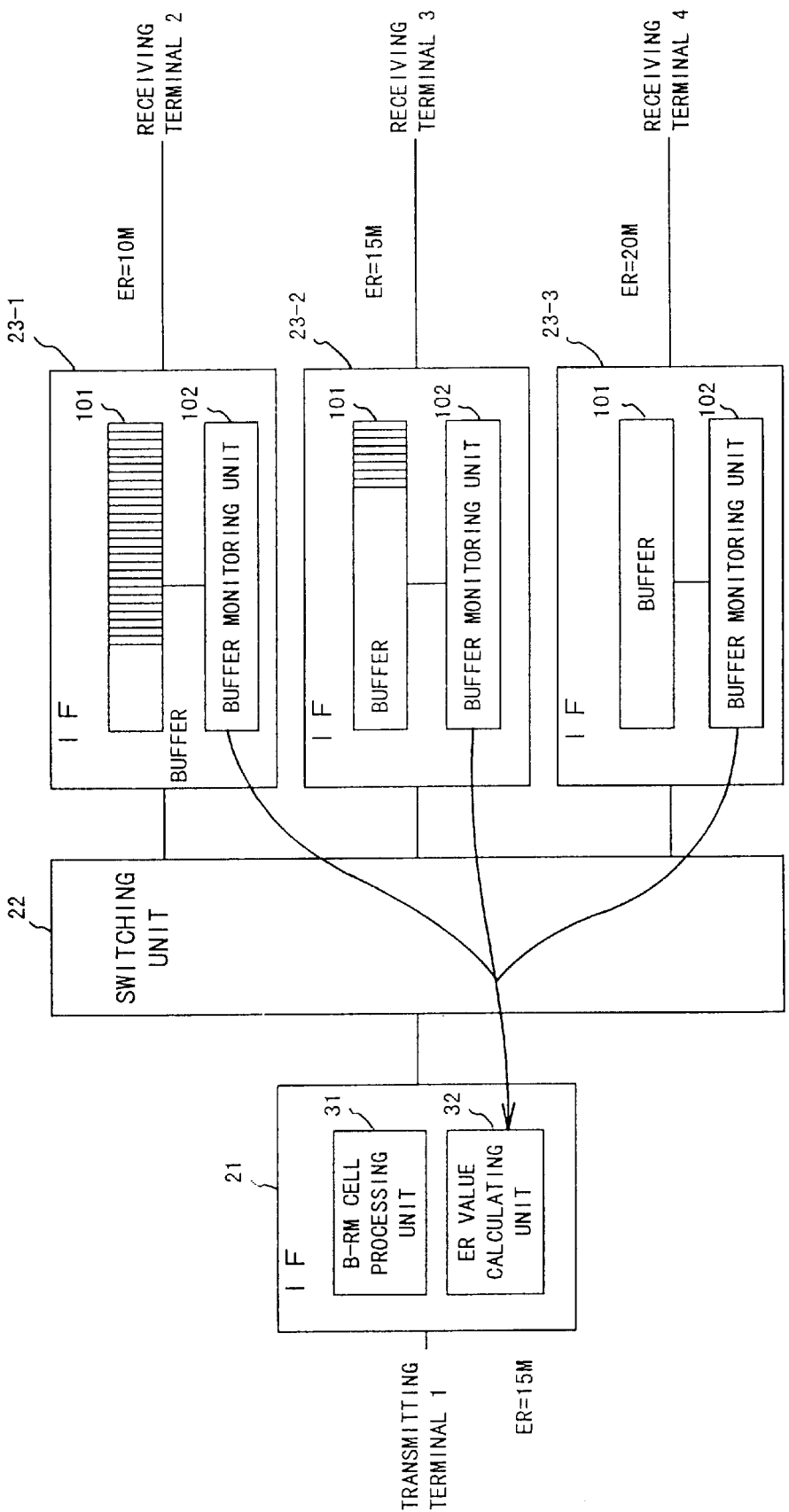
FIG. 14 is a block diagram showing the entire configuration of the transfer rate controlling device according to another preferred embodiment of the present invention.

We cite an example here. Assume that the ER values assigned to the B-RM cells returned from the receiving terminals 2 through 4 to the copy node 5 are 10 Mbps, 15 Mbps, and 20 Mbps in a multicast communication from the transmitting terminal 1 to the receiving terminals 2 through 4, as shown in FIG. 14. In this case, the IF unit 21 notifies the transmitting terminal 1 of 15 Mbps obtained as the average ER value. Upon receipt of this notification, the transmitting terminal 1 changes the transmission rate for transmitting cells to the receiving terminals 2 through 4 to 15 Mbps. IF units 23-1 through 23-3 comprise the respective buffer for storing the cells to be transmitted to the receiving terminals 2 through 4. The speeds at which the cells are read from these buffers depend on the ER values which are respectively assigned to the B-RM cells returned from the receiving terminals 2 through 4. That is, the speeds at which the cells are read from the buffers in the IF units 23-1 through 23-3 are respectively 10 Mbps, 15 Mbps, and 20 Mbps.

Looking at the buffer corresponding to the receiving terminal 2, the speed at which a cell is read (10 Mbps) is lower than the speed at which a cell is written (15 Mbps). Accordingly, if the situation where the ER value assigned to the B-RM cell transmitted from a particular terminal is lower than that of another terminal, is not temporary but is continuous, the buffer corresponding to that receiving terminal can possibly overflow.

The preferred embodiment to be provided below has the capability for monitoring the amount of data stored in the buffer arranged for each receiving terminal or for each VPI/VCI, and for calculating the ER value to be notified to a transmitting terminal in consideration of the monitoring result, in order to prevent such an overflow. Namely, as shown in FIG. 14, a buffer monitoring unit 102 monitors the amount of data stored in a buffer 101, and notifies the monitoring result to the ER value calculating unit 32. The ER value calculating unit 32 calculates the ER value to be notified to the transmitting terminal in consideration of the monitoring result.

FIG. 15A is a block diagram showing the configuration of the IF unit on the receiving terminal side according to the preferred embodiment shown in FIG. 14. A buffer memory 111 stores the cell output from the switching unit 22 for each VPI/VCI. A cell counter 112 counts the number of cells stored in the buffer memory 111 for each VPI/VCI. Namely, when a cell is input to a corresponding IF unit 23 and is written to the buffer memory 111, the cell counter 112 increments its value corresponding to the VPI/VCI of that cell by 1. Alternatively, when a cell is read from the buffer 111, the cell counter 112 decrements its value corresponding to the VPI/VCI of that cell by 1. A threshold setting unit 113 stores a predetermined threshold value. The threshold value may be set for each VPI/VCI. A comparing unit 114 makes a comparison between the value of the cell counter 112 and the threshold value stored in the threshold setting unit 113 for each VPI/VCI. If the counter value is equal to or larger than the threshold value, the comparing unit 114 determines that the possibility of an overflow of the buffer 111 is high (determines that a network or a path is congested), and notifies the IF unit 21 arranged on the transmitting terminal side of this determination result as congestion information. This congestion information is transmitted to the IF unit 21 not via the switching unit 22, but via a line which is arranged physically and separately from the path on which cells are transmitted (or via a wireless link). Additionally, the VPI/VCI corresponding to the buffer whose number of cells is equal to or larger than the threshold value is identified with this congestion information.

A B-RM cell receiving unit 115 and a read controlling unit 116 are respectively and fundamentally the same as the B-RM cell receiving unit 83 and the read controlling unit 85, which are shown in FIG. 12B. Namely, the B-RM cell receiving unit 115 extracts the VPI/VCI and the ER value from a received B-RM cell, and passes the extracted VPI/VCI and ER value to the read controlling unit 116. The read controlling unit 116 reads a cell from the buffer memory 116 according to the passed ER value (a read trigger).

FIG. 15B is a block diagram showing the configuration of the IF unit on the transmitting terminal side in the preferred embodiment shown in FIG. 14. The B-RM cell processing unit 31 is the same as that explained above. An ER value calculating unit 120 has the capability for calculating the average and minimum values of the ER value which are respectively assigned to the B-RM cells from a plurality of receiving terminals, and outputting either of the values as the ER value to be notified to the transmitting terminal according to the congestion information from the IF unit arranged on the receiving terminal side. An average value calculating unit 121 has, for example, the configuration shown in FIG. 8, 10, or 11, and is intended to calculate the average value of the ER values received from the B-RM cell processing unit 31 for each multicast group.

Figure 16:
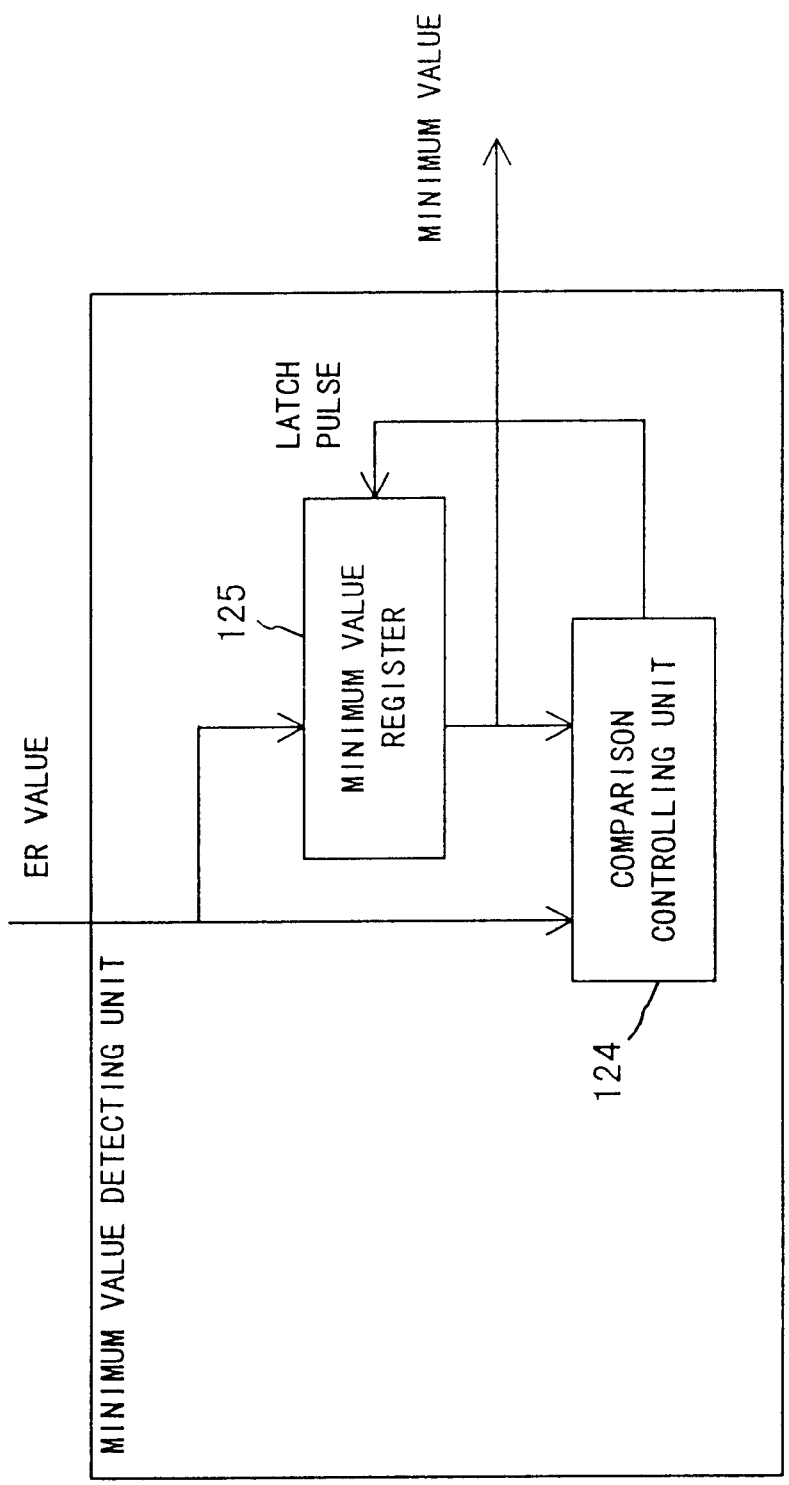
FIG. 16 exemplifies a minimum value detecting unit.

A minimum value detecting unit 122 detects the minimum value among the ER values received from the B-RM cell processing unit 31 for each multicast group. The minimum value detecting unit 122 comprises a comparison controlling unit 124 and a minimum value register 125 as shown in FIG. 16. The ER value which is newly received from the B-RM cell processing unit 31 is input to the comparison controlling unit 124 and the minimum value register 125. The comparison controlling unit 124 makes a comparison between the new ER value and the ER value stored in the minimum value register 125. This unit outputs a latch pulse only if the former is smaller than the latter. Upon receipt of the latch pulse, the value of the minimum value register is updated with the ER value which is newly received from the B-RM processing unit. As a result, the minimum value register 125 outputs the minimum value among the received ER values.

Turning back to FIG. 15B. If the congestion information from the IF unit 23 indicates "congestion: the number of cells in a buffer is equal to or larger than a threshold value", a selector 123 selects the output of the minimum value detecting unit 122. If the congestion information indicates "non-congestion: the number of cells in a buffer is smaller than the threshold", the selector 123 selects the output of the average value calculating unit 121. The output of the selector 123 is used as the ER value of the B-RM cell to be transferred to the transmitting terminal 1.

If congestion occurs on at least one of the paths to a plurality of receiving terminals in a multicast communication, the selector 123 switches the ER value to be notified to the transmitting terminal in the multicast communication from the "average value" to the "minimum value". For example, if the number of cells exceeds a threshold value in one buffer (such as the buffer arranged for the IF unit 23-1) among the buffers 101 which are respectively arranged for the receiving terminal 2 through 4, the buffer monitoring unit 10 corresponding to that buffer notifies the ER value calculating unit 32 that the number of cells exceeds the threshold. Upon receipt of this notification, the ER value calculating unit 32 outputs the minimum value (10 Mbps) among the three ER values received from the receiving terminals 2 through 4 as the ER value to be notified to the transmitting terminal 1. As described above, if the minimum value among the ER values which are respectively assigned to the B-RM cells is selected as the ER value to be notified to the transmitting terminal 1, the transmission rate of the transmitting terminal 1 becomes the minimum value. As a result, the overflow of the buffer 101 arranged in the IF unit 23-1 can be prevented.

According to this preferred embodiment, the number of cells stored in the output buffer within a copy node is monitored, and the ER value to be notified to a transmitting terminal is changed also in consideration of that number as described above. As a result, the possibility of discarding cells is significantly reduced.

FIGS. 17A and 17B exemplify the modifications of the IF units shown in FIGS. 15A and 15B. In the configurations shown in FIGS. 15A and 15B, if the number of cells stored in the buffer memory exceeds a threshold value, this information is notified to the ER value calculating unit via a line arranged separately from the path on which cells are transmitted. In the meantime, in the configurations shown in FIGS. 17A and 17B, the information is notified to the ER value calculating unit by using a B-RM cell.

If the value of a cell counter 112 corresponding to certain VPI/VCI is equal to or larger than a threshold value stored in a threshold setting unit 113, a comparing unit 117 sets the congestion flag corresponding to the VPI/VCI. When the congestion flag corresponding to the certain VPI/VCI is set by the comparing unit 117, a B-RM cell receiving unit 118 sets the congestion flag of the B-RM cell to which this VPI/VCI is assigned. According to this preferred embodiment, each B-RM cell is assumed to include the bit for the congestion flag. In this case, the congestion flag can be implemented as one bit among the reserved bits (one bit among the bits "Res" shown in FIG. 5), or as additional information (also referred to as tag information) to be used within a switch.

The B-RM cell in which the congestion flag is set is transferred to the IF unit 21 on the transmitting terminal side via the switching unit 22. When the B-RM cell reaches the IF unit 21, the B-RM cell processing unit 31 extracts and passes the VPI/VCI, the ER value, and the value of the congestion flag extracted from the B-RM cell to the ER value calculating unit 130.

The average value calculating unit 121 and the minimum value detecting unit 122 output the average and minimum values of ER values for each multicast group, as explained by referring to FIG. 15B. If the congestion flag is not set, a selector 131 selects the average value. If the congestion flag is set, the selector 131 selects the minimum value.

As described above, the method for notifying the occurrence of congestion in the configurations shown in FIGS. 15A and 15B is different from that in the configurations shown in FIGS. 17A and 17B. However, the other fundamental operations are the same. Note that the occurrence of congestion is notified by using a B-RM cell in the configurations shown in FIGS. 17A and 17B. Therefore, there is no need for newly arranging the line for notifying the congestion information, which leads to a simplification of the configuration.

In the above described configurations shown in FIGS. 15A and 15B or in FIGS. 17A and 17B, the selector 123 or the selector 131 switches the ER value to be notified to the transmitting terminal from the minimum value to the average value upon receipt of the notification that the number of cells stored in the buffer has decreased after a congested state is resolved. Notice that the threshold value for switching the ER value to be notified to the transmitting terminal from the minimum value to the average value is defined to be smaller than that for switching the ER value from the average value to the minimum value.

According to the preferred embodiments shown in FIGS. 15 through 17, the ER value to be notified to a transmitting terminal is immediately restored from the minimum value to the average value after the congested state is resolved. However, because a network load suddenly increases by changing the ER value from the minimum value to the average value in such a configuration, other paths in the network may be affected. In the following preferred embodiment, the ER value to be notified to a transmitting terminal is restored from the minimum value to the average value in increments in order to prevent such a sudden load increase, when a congested state is resolved.

Figure 18:
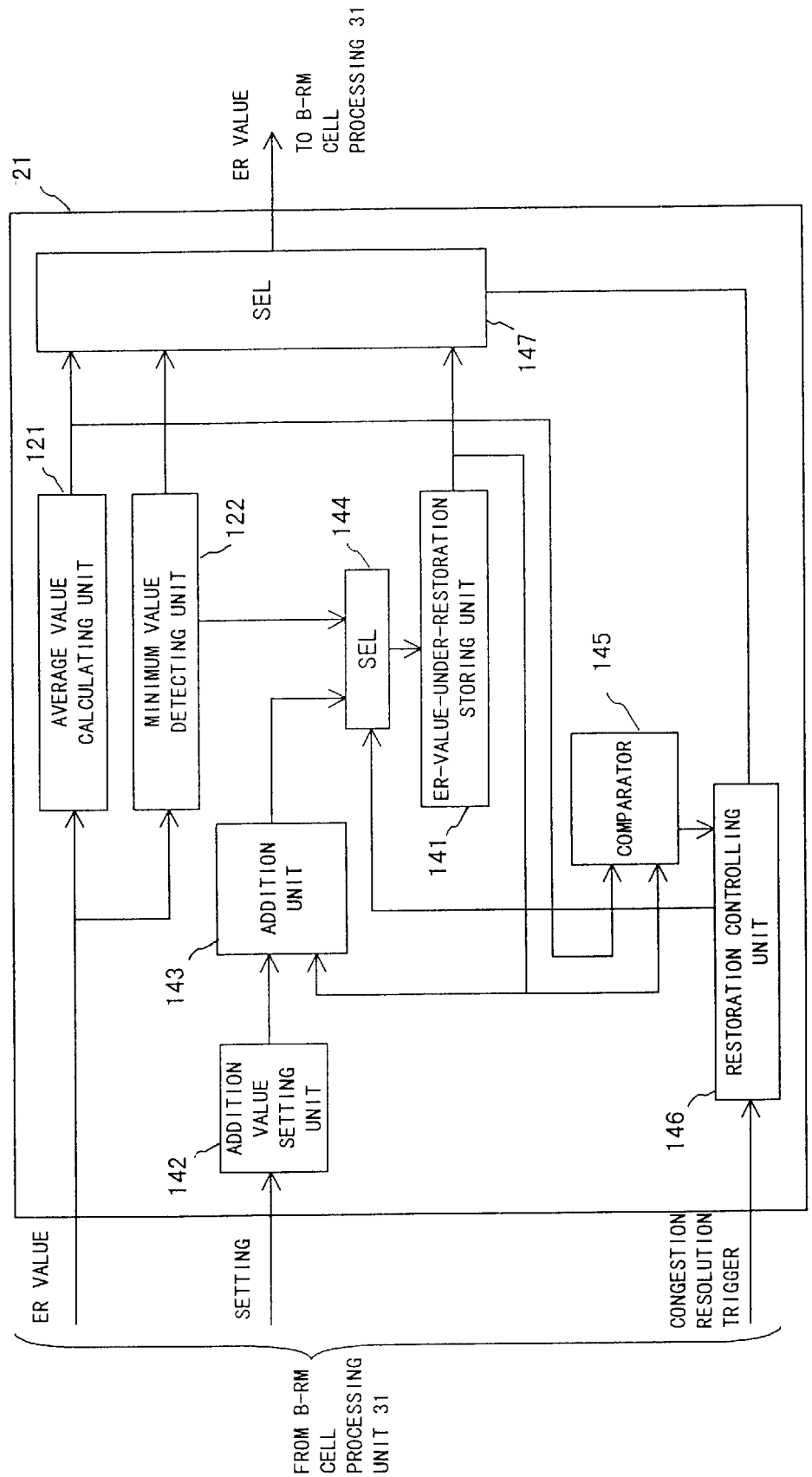
FIG. 18 is a block diagram showing the configuration of an ER value calculating unit having the capability for changing an ER value in increments.

FIG. 18 shows the configuration of the ER value calculating unit having the capability for changing the ER value in increments. An average value calculating unit 121 and a minimum value detecting unit 122 respectively output the average ER and minimum values for each multicast group, as explained by referring to FIG. 15B. An ER-value-under-restoration storing unit 141 temporarily stores the ER value to be notified to a transmitting terminal, which is being restored in increments from the minimum value to the average value. An addition value setting unit 142 stores the addition value when the ER value is restored in increments. An adding unit 143 adds the addition value stored in the addition value setting unit 142 to the ER value output from the ER-value-under-restoration storing unit 141. A selector 144 normally selects the detected value of the minimum value detecting unit 122 as the initial value to be written to the ER-value-under-restoration storing unit 141. Upon receipt of the notification that the congested state is resolved, the selector 144 selects the output of the adding unit 143.

A comparator 145 makes a comparison between the output of the average value calculating unit 121 and that of the ER-value-under-restoration storing unit 141. When the ER value output from the ER-value-under-restoration storing unit 141 increases and reaches the ER value output from the average value calculating unit 121, the comparator 145 notifies a restoration controlling unit 146 of this information. The restoration controlling unit 146 controls a selector 147 according to the trigger signal, which indicates that the congestion state is resolved, output from the IF unit arranged on the receiving terminal side, and the output of the comparator 145. This trigger signal may be, for example, the congestion flag shown in FIG. 17A or 17B. In such a case, the reset of the congestion flag is defined to be "congestion resolution". The selector 147 selects one of the outputs of the average value calculating unit 121, the minimum value detecting unit 122, and the ER-value-under-restoration storing unit 141 according to the control performed by the restoration controlling unit 146.

Provided next is the explanation about the operations of the ER value calculating unit shown in FIG. 18. In this ER value calculating unit, the selector 147 outputs the average value calculated by the average value calculating unit 121 as the ER value to be notified to a transmitting terminal according to the instruction issued from the restoration controlling unit 146, while congestion does not occur. However, when the information that congestion has occurred on a path to a receiving terminal is notified from any of the buffer monitoring units 102, the selector 147 outputs the minimum value detected by the minimum value detecting unit 122 as the ER value to be notified to the transmitting terminal. In this way, the transmission rate of the transmitting terminal is switched from the average value to the minimum value.

Upon receipt of the congestion resolution trigger signal after the congested state terminates, the restoration controlling unit 146 makes the selector 144 select the output of the adding unit 143, and makes the selector 147 select the output of the ER-value-under-restoration storing unit 141. That is, the selector 147 outputs the value obtained by adding the addition value to the minimum value as the ER value to be notified to a transmitting terminal. This addition process is repeatedly executed at predetermined time intervals. Therefore, as the ER value stored in the ER-value-under-restoration storing unit 141 becomes larger in increments, also the ER value to be notified to a transmitting terminal becomes larger in increments. As a result, the transmission rate of the transmitting terminal becomes gradually increases.

When the ER value output from the ER-value-under-restoration storing unit 141 increases and reaches the average value, the restoration controlling unit 146 makes the selector 147 select the output of the average value calculating unit 121. As a result, the average value calculated by the average value calculating unit 121 is notified to the transmitting terminal.

According to the above described preferred embodiment, the ER value to be notified to a transmitting terminal is increased in increments when a congested state is resolved. However, the capability for decreasing the ER value to be notified to a transmitting terminal in increments when congestion occurs may be adopted. However, since it is vital to prevent cells from being discarded when congestion occurs, the transmission rate of the transmitting terminal must be immediately decreased. Therefore, it is desirable to assign a higher priority to the capability for increasing the ER value in increments than to the capability for decreasing the ER value in increments, and to adopt the former capability.

As described above, the copy node according to this preferred embodiment merges a plurality of B-RM cells received from a plurality of receiving terminals into one B-RM cell, and transfers the one merged cell to a transmitting terminal. The B-RM cell to be transferred to the transmitting terminal can be newly generated in an IF unit. However, one of the plurality of B-RM cells received from the plurality of receiving terminals may be used.

Figures 19A, 19B:
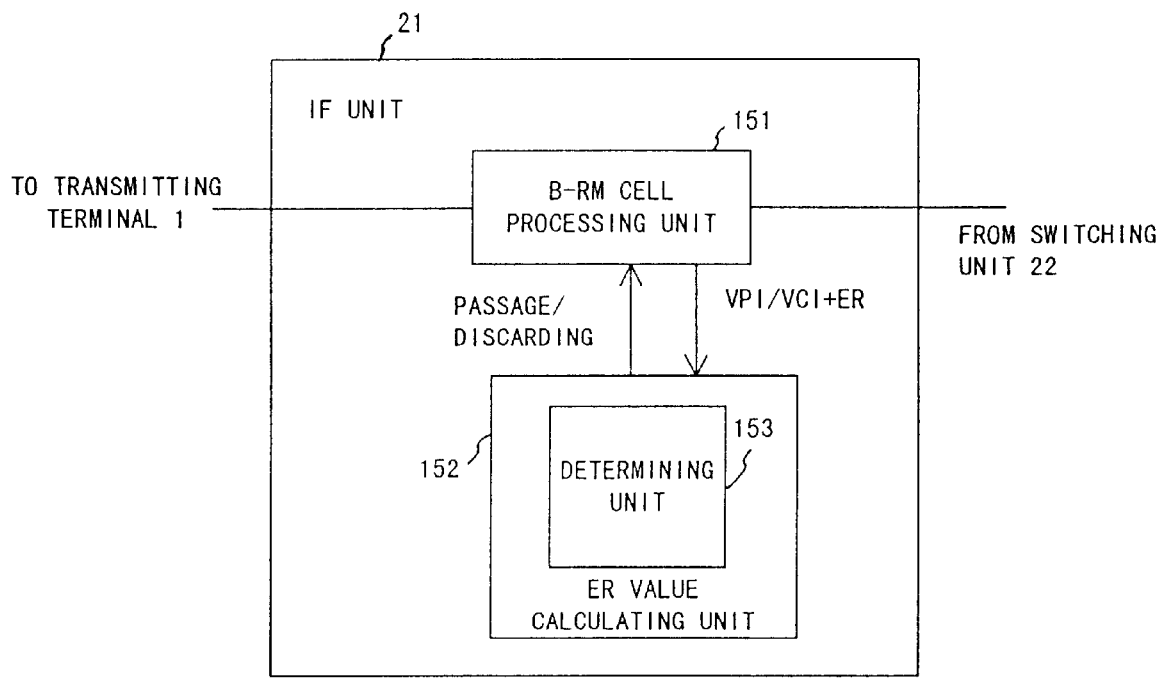
FIG. 19A is a block diagram showing the configuration of an IF unit for transferring a B-RM cell to a transmitting terminal by using a received B-RM cell.
FIG. 19B exemplifies the table used by the IF unit shown in FIG. 19A.

FIG. 19A is a block diagram showing the configuration of the IF unit for transferring a B-RM cell to a transmitting terminal by using a received B-RM cell. When a B-RM cell reaches the IF unit 21, a B-RM cell processing unit 151 passes its VPI/VCI and ER value to an ER value calculating unit 152 while holding the B-RM cell. The. fundamental capabilities of the ER value calculating unit 152 are the same as those described above.

The ER value calculating unit 152 comprises a determining unit 153. The determining unit 153 comprises a table as shown in FIG. 19B. The VPI/VCI corresponding to a receiving terminal belonging to a multicast group is registered to this table for each multicast group, and the VPI/VCI corresponding to one certain receiving terminal is specified for each multicast group.

Upon receipt of the VPI/VCI from the B-RM cell processing unit 151, the determining unit 153 determines (1) whether or not the received VPI/VCI belongs to a multicast group, and (2) whether or not the VPI/VCI is predetermined if it belongs to a multicast group. If the VPI/VCI of the received B-RM cell belongs to an arbitrary multicast group and is predetermined, the ER value calculating unit 152 writes the calculated ER value to the B-RM cell held by the B-RM cell processing unit 151. The B-RM cell is assigned with the VPI/VCI for specifying the path to the transmitting terminal 1, and is transmitted to the transmitting terminal 1. If the VPI/VCI of the received B-RM cell is not predetermined although it belongs to an arbitrary multicast group, the ER value calculating unit 152 discards the B-RM cell held by the B-RM cell processing unit. If the VPI/VCI of the received B-RM cell does not belong to any multicast group, the B-RM cell processing unit 151 makes the held B-RM cell pass through.

The copy node explained by referring to FIGS. 3 through 19 has the capability for copying the cell (including a user data cell and an F-RM cell) transmitted from a transmitting terminal and transferring the copied cells to a plurality of receiving terminals, and has the capability for calculating the ER value to be notified to the transmitting terminal based on the ER values assigned to the B-RM cells returned from the plurality of receiving terminals. The transfer rate controlling device according to the preferred embodiments of the present invention implements the latter capability. However, the transfer rate controlling device according to the present invention is not limited to the above described implementation within the copy node. For example, the transfer rate controlling device can be arranged in each transmitting terminal. That is, the ER value instructing the transmission rate of a transmitting terminal may be calculated by the transmitting terminal itself. In this case, the B-RM cell processing unit and the ER value calculating unit are arranged in each transmitting terminal, and a copy node transfers the B-RM cells received from a plurality of receiving terminals unchanged without merging them. The B-RM cell processing unit and the ER value calculating unit, which are arranged in each transmitting terminal, perform, for example, the processes shown in FIGS. 8 through 11.

According to the above described preferred embodiment, the ER value calculating unit simply averages a plurality of ER values. However, the present invention is not limited to this implementation. The parameter instructing the transmission rate of a transmitting terminal may be determined by another arithmetic calculation. For example, the parameter instructing the transmission rate of a transmitting terminal may be adjusted according to the number of receiving terminals to which a cell is multicast.

Furthermore, according to the above described preferred embodiment, the arithmetic calculation is performed for the ER value by taking the ABR service as an example. The present invention, however, is not limited to this implementation. The transfer rate controlling device according to the present invention can be flexibly applied to a device for determining the transmission rate of a transmitting terminal according to the transfer rates allowed by a plurality of receiving terminals or the path to the plurality of receiving terminals in a multicast communication network.

According to the present invention, the parameter instructing the transmission rate of a transmitting terminal is generated by performing a predetermined arithmetic calculation for the ER values returned over the paths to a plurality of receiving terminals in a multicast communication, thereby optimizing the transmission rate of the transmitting terminal. As a result, the improvement of the transfer efficiency and the prevention of cell discarding can be realized in good balance.

What is claimed is:

1. A transfer rate controlling device for controlling a transmission rate of a transmitting terminal when the transmitting terminal multicasts a fixed-length packet to a plurality of receiving terminals in a network where a transfer rate allowed by a path to a receiving terminal is notified to the transmitting terminal by a management fixed-length packet while the transmitting terminal transfers a fixed-length packet to the receiving terminal, comprising:

extracting means for extracting transfer rate information from management fixed-length packets which are sent from the plurality of receiving terminals to the transmitting terminal;

calculating means for obtaining a parameter instructing a transmission rate of the transmitting terminal by performing a predetermined calculation for a plurality of sets of transfer rate information extracted by said extracting means; and notifying means for notifying the transmitting terminal of the parameter obtained by said calculating means.

2. The transfer rate controlling device according to claim 1, wherein said calculating means calculates an average value of the plurality of sets of transfer rate information as the parameter to be notified to the transmitting terminal.

3. The transfer rate controlling device according to claim 1, wherein said calculating means obtains the parameter based on the number of management fixed-length packets which proceed to the transmitting terminal and are detected within a predetermined observation time period, and transfer rates which are respectively assigned to management fixed-length packets detected within the observation time period.

4. The transfer rate controlling device according to claim 1, wherein said calculating means obtains, when a predetermined number of management fixed-length packets which proceed to the transmitting terminal is detected, the parameter based on transfer rates which are respectively assigned to the predetermined number of detected management fixed-length packets.

5. The transfer rate controlling device according to claim 1, wherein said calculating means obtains the parameter based on transfer rates which are respectively assigned to management fixed-length packets which proceed to the transmitting terminal and are detected during a time interval while two succeeding management fixed-length packets which proceed to the transmitting terminal from a predetermined path are detected.

6. The transfer rate controlling device according to claim, further comprising:

a buffer for storing a fixed-length packet which is transmitted from the transmitting terminal, said fixed-length packet being copied for transferring said fixed-length packet to the plurality of receiving terminals in correspondence with paths to the plurality of receiving terminals; and transmitting means for reading a fixed-length packet from said buffer according to the transfer rate extracted by said extracting means corresponding to a path on which the management fixed-length packet including the extracted transfer rate has been transferred, and for transmitting the read fixed-length packet via the path.

7. The transfer rate controlling device according to claim 6, wherein said buffer is a memory shared by a plurality of paths.

8. A transfer rate controlling device for controlling a transmission rate of a transmitting terminal when the transmitting terminal multicasts a fixed-length packet to a plurality of receiving terminals in a network where a transfer rate allowed by a path to a receiving terminal is notified to the transmitting terminal by a management fixed-length packet while the transmitting terminal transfers a fixed-length packet to the receiving terminal, comprising:

extracting means for extracting transfer rate information from management fixed-length packets which are sent from the plurality of receiving terminals to the transmitting terminal;

calculating means for obtaining a parameter instructing a transmission rate of the transmitting terminal by performing a predetermined calculation for a plurality of sets of transfer rate information extracted by said extracting means; and notifying means for notifying the transmitting terminal of the parameter obtained by said calculating means;

a buffer for storing a fixed-length packet which is transmitted from the transmitting terminal, said fixed-length packet being copied for transferring said fixed-length packet to the plurality of receiving terminals in correspondence with paths to the plurality of receiving terminals;

transmitting means for reading a fixed-length packet from said buffer according to the transfer rate extracted by said extracting means corresponding to a path on which the management fixed-length packet including the extracted transfer rate has been transferred, and for transmitting the read fixed-length packet via the path;

monitoring means for monitoring the number of fixed-length packets stored in said buffer for each of the paths to the plurality of receiving terminals; and monitoring result notifying means for notifying said calculating means of a monitoring result of said monitoring means, wherein said calculating means changes a method for calculating the parameter base on notification from said monitoring result notifying means.

9. The transfer rate controlling device according to claim 8, wherein said monitoring result notifying means notifies said calculating means of the monitoring result via a medium which is physically different from each of the paths to the plurality of receiving terminals.

10. The transfer rate controlling device according to claim 8, wherein said monitoring result notifying means notifies said calculating means of the monitoring result by using a fixed-length packet.

11. The transfer rate controlling device according to claim 8, wherein said calculating means outputs a minimum value among a plurality of transfer rates extracted by said extracting means, when receiving from said monitoring result notifying means notification indicating that the number of fixed-length packets exceeds a predetermined threshold value.

12. The transfer rate controlling device according to claim 11, wherein said calculating means changes the parameter gradually from the minimum value to an average value of the plurality of transfer rates, when receiving from said monitoring result notifying means notification indicating that the number of fixed-length packets becomes smaller than a predetermined number.

13. The transfer rate controlling device according to claim 1, wherein said notifying means notifies the transmitting terminal of the parameter by using a predetermined fixed-length packet among management fixed-length packets which proceed to the transmitting terminal.

14. The transfer rate controlling device according to claim 13, wherein said notifying means discards a fixed-length packet other than the predetermined fixed-length packet among the management fixed-length packets which proceed to the transmitting terminal.

15. A transfer rate controlling device for controlling a transmission rate of a transmitting terminal in a network where a fixed-length packet is multicast from the transmitting terminal to a plurality of receiving terminals, comprising:

detecting means for detecting transfer rates allowed by the plurality of receiving terminals or by paths to the plurality of receiving terminals;

calculating means for obtaining an average value of the plurality of transfer rates detected by said detecting means as a parameter instructing the transmission rate of the transmitting terminal; and notifying means for notifying the transmitting terminal of the parameter obtained by said calculating means.

16. A transfer rate controlling device for controlling a transmission rate of a transmitting terminal in a system where a cell is multicast by using an ABR service, comprising:

means for performing a predetermined calculation for ER values which are respectively stored in B-RM cells from a plurality of receiving terminals receiving multicast cells; and means for writing a result of the calculation to a B-RM cell to be transferred to the transmitting terminal.

17. A transfer rate controlling device for controlling a transmission rate of a transmitting terminal when the transmitting terminal multicasts a fixed-length packet to a plurality of receiving terminals in a network where a transfer rate allowed by a path to a receiving terminal is notified to the transmitting terminal by a management fixed-length packet while the transmitting terminal transfers a fixed-length packet to the receiving terminal, comprising:

extracting means for extracting the transfer rate from a management fixed-length packet which arrives at the transmitting terminal;

calculating means for obtaining a parameter instructing a transmission rate by performing a predetermined calculation for a plurality of transfer rates extracted by said extracting means; and controlling means for controlling the transmission rate of the transmitting terminal based on the parameter obtained by said calculating means.

18. A transfer rate controlling method for controlling a transmission rate of a transmitting terminal when the transmitting terminal multicasts a fixed-length packet to a plurality of receiving terminals in a network where a transfer rate allowed by a path to a receiving terminal is notified to the transmitting terminal by a management fixed-length packet while the transmitting terminal transfers a fixed-length packet to the receiving terminal, comprising the steps of:

extracting the transfer rate from a management fixed-length packet which proceeds to the transmitting terminal;

obtaining a parameter instructing a transmission rate of the transmitting terminal by performing a predetermined calculation for a plurality of extracted transfer rates; and notifying the transmitting terminal of the obtained parameter.

* * * * *